(12) United States Patent
Winstead

(10) Patent No.: US 7,963,273 B2
(45) Date of Patent: *Jun. 21, 2011

(54) CYLINDER CHARGE TEMPERATURE CONTROL FOR AN INTERNAL COMBUSTION ENGINE

(75) Inventor: Vincent J. Winstead, Mankato, MN (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/859,431

(22) Filed: Aug. 19, 2010

(65) Prior Publication Data

US 2010/0307435 A1 Dec. 9, 2010

Related U.S. Application Data

(63) Continuation of application No. 11/776,671, filed on Jul. 12, 2007, now Pat. No. 7,779,823.

(51) Int. Cl.
*F02M 25/07* (2006.01)
*F02B 47/08* (2006.01)
*F02B 17/00* (2006.01)

(52) U.S. Cl. ............. 123/568.14; 123/90.11; 123/90.15; 123/58.8; 123/295; 123/305

(58) Field of Classification Search ............... 123/90.11, 123/90.15–90.18, 58.8, 198 F, 316, 481, 123/568.11–568.14, 568.21, 295, 305, 430, 123/431; 60/278, 279, 605.2
See application file for complete search history.

(56) References Cited

U.S. PATENT DOCUMENTS

| | | | |
|---|---|---|---|
| 3,941,113 A * | 3/1976 | Baguelin ................. | 123/568.11 |
| 4,143,635 A * | 3/1979 | Iizuka et al. ............. | 123/568.11 |
| 5,517,976 A * | 5/1996 | Bachle et al. ............ | 123/568.11 |
| 6,478,017 B2 * | 11/2002 | Bianchi .................... | 123/568.12 |
| 6,543,230 B1 * | 4/2003 | Schmid ..................... | 60/605.2 |
| 6,543,411 B2 * | 4/2003 | Raab et al. ............... | 123/568.14 |
| 6,752,132 B2 * | 6/2004 | Remmels et al. ........ | 123/568.11 |
| 7,765,994 B2 * | 8/2010 | Winstead ................. | 123/568.13 |
| 7,779,823 B2 * | 8/2010 | Winstead ................. | 123/568.14 |
| 2009/0013669 A1 * | 1/2009 | Winstead ................. | 60/278 |
| 2009/0013969 A1 * | 1/2009 | Winstead ................. | 123/481 |

* cited by examiner

*Primary Examiner* — Willis R Wolfe, Jr.
(74) *Attorney, Agent, or Firm* — Allan J. Lippa; Alleman Hall McCoy Russell & Tuttle LLP

(57) ABSTRACT

An engine is operated with a first cylinder to provide a net flow of gases from the engine intake to the engine exhaust while a second cylinder returns combusted gases back to the intake to control a timing of auto-ignition combustion in the first cylinder.

12 Claims, 19 Drawing Sheets

CYLINDER CHARGE TEMPERATURE CONTROL FOR AN INTERNAL COMBUSTION ENGINE

CROSS REFERENCE TO RELATED APPLICATION

The present application is a continuation of U.S. patent application Ser. No. 11/776,671 filed on Jul. 12, 2007, the entire contents of which are incorporated herein by reference.

BACKGROUND AND SUMMARY

Some engines may be configured to perform what may be referred to as controlled auto-ignition (CAI), whereby a mixture including air and fuel is auto-ignited during a compression stroke of the cylinder's piston without necessarily requiring a spark or a pilot injection to initiate combustion. One particular type of controlled auto-ignition known as homogeneous charge compression ignition (HCCI) includes auto-ignition of a substantially homogenous mixture of air and fuel. HCCI may be used to achieve improved engine efficiency and reduced emissions, under some conditions. However, under other conditions, it may be difficult to achieve auto-ignition or to control the timing of auto-ignition. For example, during certain higher or lower engine torque or engine speed ranges, auto-ignition may be difficult to control resulting in misfire, engine knock, or pre-ignition.

One approach to address this issue includes the use of charge temperature control to extend the operating range of auto-ignition. As one example, exhaust gases may be recirculated from the exhaust manifold to the intake manifold via an external exhaust gas recirculation (EGR) passage. These EGR gases may be used to provide charge heating, whereby the amount of EGR gases supplied to the cylinders may be adjusted to control the timing of auto-ignition. In this way, HCCI mode operation may be extended. However, the inventors of the present disclosure have recognized that this approach utilizes additional hardware including an EGR passage, EGR valves, and additional control systems, thereby increasing the cost or complexity of the engine system. As another example, a portion of the exhaust gases retained by each cylinder may be controlled by varying the timing of an exhaust valve of the cylinder. However, the inventors herein have recognized that this approach may still not provide sufficient charge heating during some conditions. For example, during lower engine load conditions, the cylinder may not retain sufficient heat to enable auto-ignition.

In order to address some of these and other issues, the inventors herein have provided a method of operating an engine including at least a first cylinder and a second cylinder. The method comprises operating the first cylinder of the engine to provide a net flow of gases from an intake manifold to an exhaust manifold for a plurality of cycles of the first cylinder and combusting a first mixture including said gases in said first cylinder by auto-ignition; and during said operation of the first cylinder, repetitively operating the second cylinder of the engine to admit gases from the intake manifold into the second cylinder and retaining the admitted gases within the second cylinder for a period before exhausting the admitted gases into the intake manifold; and adjusting an operating parameter of the second cylinder to vary a timing of said auto-ignition by the first cylinder.

In this way, gases including intake air and/or recirculated exhaust gases may be temporarily admitted to the second cylinder to enable heat transfer from the engine to the admitted gases before releasing the heated gases back into the intake manifold where they may be entrained by the first cylinder to facilitate auto-ignition. Operating parameters of the second cylinder such as spark timing, valve timing, fuel injection amount and timing, among other operating parameters of the second cylinder may be adjusted to vary the amount of heat transferred to the admitted gases and/or the amount of the gases admitted to the second cylinder and released into the intake manifold. Note that in some conditions, the second cylinder may perform combustion while trapping, heating, and releasing gases to the intake manifold, thereby also providing torque to the engine crankshaft in addition to the first cylinder.

DETAILED DESCRIPTION

Charge heating for a first group of cylinders of an internal combustion engine will be described. As one example, charge heating may be provided by supplying gasses of increased temperature including at least one of exhaust gases and heated intake air to an intake manifold of the first cylinder group via a second cylinder group. The first and second cylinder groups may each include one or more cylinders. Each cylinder of the second cylinder group can provide a net flow of exhaust gases to the intake manifold from the exhaust manifold or temporarily trap intake air from the intake manifold where it may be reintroduced after being heated by the cylinder. The heated gases provided to the intake manifold by the second cylinder group may be entrained by the first cylinder group to increase the charge temperature of these cylinders, which may be beneficial for some combustion modes. As one non-limiting example, charge heating may be used enable auto-ignition in the first cylinder group and/or to vary the timing of auto-ignition in the first cylinder group.

Figure 1A:
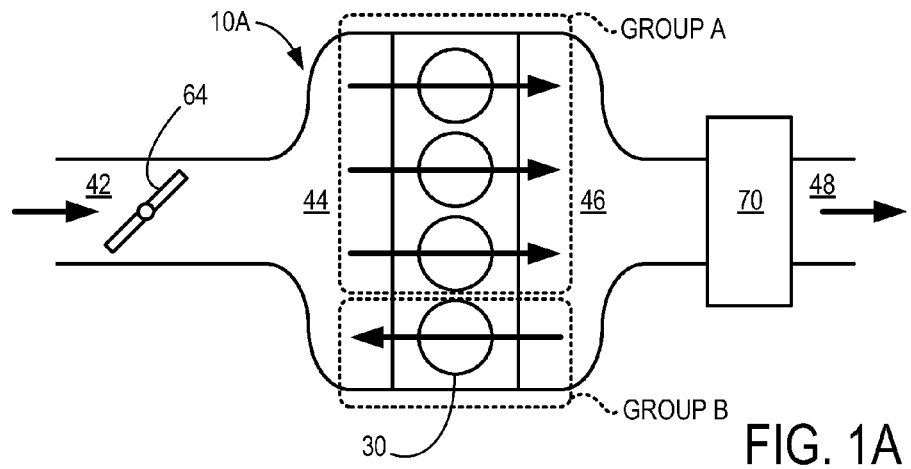
FIGS. 1A, 1B, and 1C show net flow for each cylinder of example engines.

FIG. 1A shows an example engine 10A including a plurality of combustion chambers or cylinders 30. Engine 10A can receive intake air via an intake passage 42 communicating with intake manifold 44. The amount of air supplied to the cylinders of the engine can be controlled by adjusting a position of throttle 64 and/or one or more intake manifold valves coupled to the cylinders, which are shown in greater detail in FIG. 2. Engine 10A can exhaust combustion products via an exhaust manifold 46 communicating with exhaust passage 48. Exhaust passage 48 can include an exhaust after-treatment device 70. Thus, as shown by FIG. 1A, net flow of the engine if from intake passage 42 through engine 10A to exhaust passage 48, where it may be exhausted to the surrounding environment.

As indicated by FIG. 1A, engine 10A includes a plurality of cylinders including a first cylinder group denoted as Group A and a second cylinder group denoted as Group B. In this example, each cylinder of the first cylinder group (Group A) provides a net flow of gases from intake manifold 44 to exhaust manifold 46. In contrast, each cylinder of the second cylinder group (Group B) provides a net flow of gases from exhaust manifold 46 to intake manifold 44. For example, Group B can transfer exhaust gases from the exhaust manifold to the intake manifold, where they may be entrained by the cylinders of Group A in addition to intake air received via intake passage 42. Thus, while the net flow through engine 10A is from the intake passage to the exhaust passage, some of the cylinders can provide a net cylinder flow from exhaust manifold 46 to intake manifold 44. In this way, heated gases including exhaust gases may be supplied to the intake of the Group A cylinders via the cylinders of Group B.

Furthermore, the cylinders of Group B can further increase the temperature of the gases provided to the intake manifold by performing combustion with these gases. Thus, in some examples, combustion in each cylinder of Group B may be discontinued, while in other examples, combustion may be performed in each cylinder of Group B. In some examples, the cylinders of Group A may utilize at least a portion of the gases supplied to the intake manifold via the cylinders of Group B to perform auto-ignition.

While FIG. 1A shows Group A including three cylinders and Group B including one cylinder, it should be appreciated Groups A and B may include different numbers of cylinders in other examples. Furthermore, the position of the cylinder of Group B relative to the position of the cylinders of Group A can be different. For example, the cylinder of Group B can be between two cylinders of Group A. The distribution of gases provided to the intake manifold via the cylinders of Group B can be adjusted by varying the position of the cylinders of Group B relative to the cylinders of Group A. In this way, the distribution of exhaust gases provided to the intake manifold can be adjusted so that the cylinders of Group A receive substantially the same mixture of intake air and the exhaust gases.

Figure 1B:
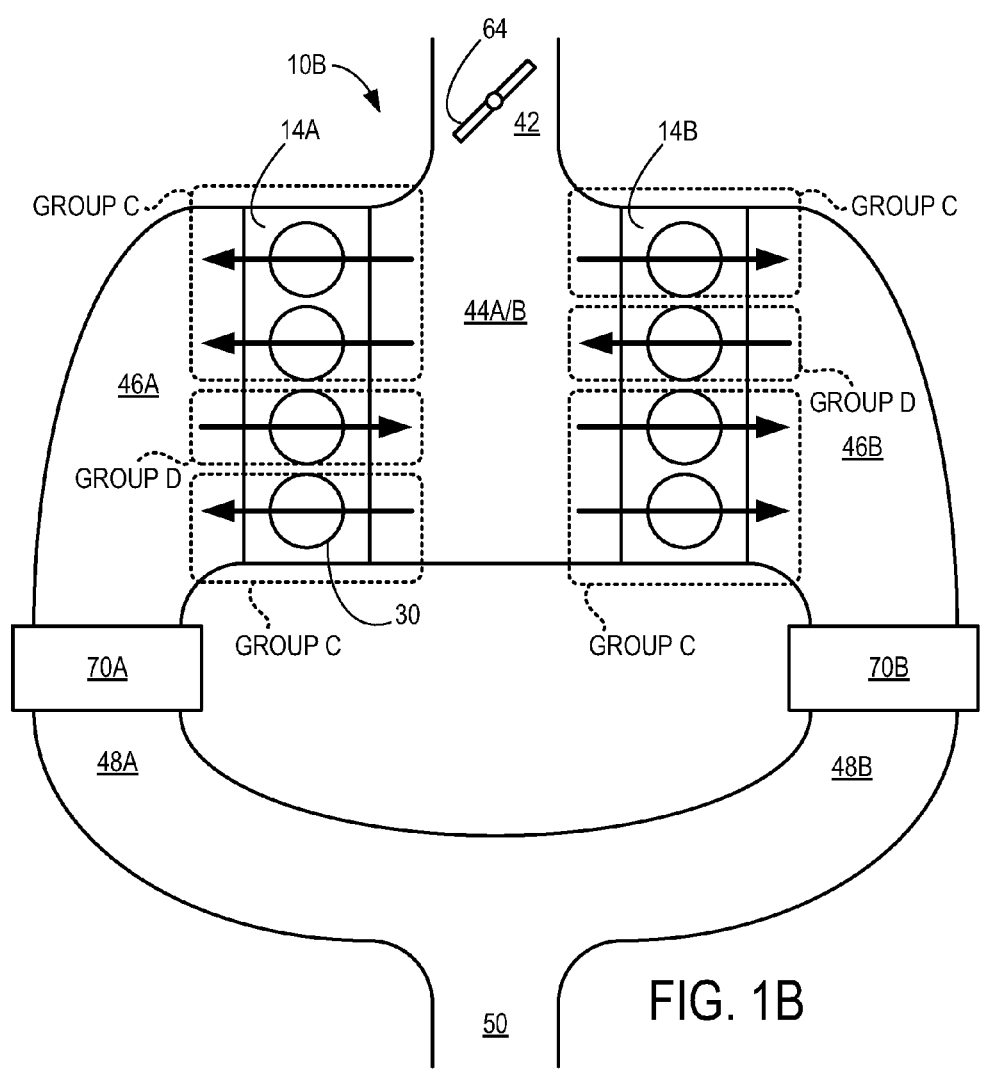

FIG. 1B shows an example engine 10B including two banks of cylinders denoted 14a and 14b. Engine 10B can receive intake air via intake passage 42 communicating with intake manifold 44A/B. While engine 10B is shown in FIG. 1B to include a common intake manifold, it should be appreciated that in some embodiments, engine 10B may include separate intake manifold so that engine bank 14a receives intake air via intake manifold 44A and engine bank 14b receives intake air via intake manifold 44B. Thus, the common intake manifold of FIG. 1A is denoted by 44A/B. The amount of air supplied to the engine cylinders can be controlled by adjusting a position of throttle 64 and/or one or more intake manifold valves coupled to the cylinders, which are shown in greater detail in FIG. 2.

Engine bank 14a can exhaust combustion products via an exhaust manifold 46A communicating with exhaust passage 48A. Exhaust passage 48A can include an exhaust after-treatment device 70A. Similarly, engine bank 14b can exhaust combustion products via an exhaust manifold 46B communicating with exhaust passage 48B. Exhaust passage 48B can include an exhaust after-treatment device 70B. Finally, exhaust passages 48A and 48B can combine at exhaust passage 50. However, in some embodiments, exhaust passages 48A and 48B may not be combined. Thus, as shown by FIG. 1B, net engine flow is from intake passage 42 through banks 14a and/or 14b of engine 10B to exhaust passage 50, where it may be exhausted to the surrounding environment.

As indicated by FIG. 1B, engine 10B includes a plurality of cylinders including a first cylinder group denoted as Group C and a second cylinder group denoted as Group D. The first group of cylinders (Group C) and the second group of cylinders (Group D) may be included with each bank of the engine. However, in some embodiments, bank 14a may include a different quantity of cylinders of the first cylinder group and second cylinder group than bank 14b. In this example, each cylinder of the first cylinder group (Group C) of bank 14a provides a net flow from intake manifold 44A to exhaust manifold 46A and each cylinder of the first cylinder group of bank 14b provides a net flow from intake manifold 44B to exhaust manifold 44B. In contrast, each cylinder of the second cylinder group (Group D) provides a net flow from exhaust manifold 46A to intake manifold 44A for bank 14a and from exhaust manifold 46B to intake manifold 44B for bank 14b. Thus, while the net flow through engine 10B is from intake passage 42 to exhaust passage 50, some of the cylinders can provide a net cylinder flow from exhaust manifolds 46A or 46B to intake manifolds 44A or 44B.

Furthermore, the cylinders of Group D can further increase the temperature of the gases provided to the intake manifold by performing combustion with these gases. Thus, in some examples, combustion in each cylinder of Group B may be discontinued, while in other examples, combustion may be performed in each cylinder of Group B. In some examples, the cylinders of Group C may utilize at least a portion of the gases supplied to the intake manifold via the cylinders of Group D to perform auto-ignition.

Figure 1C:
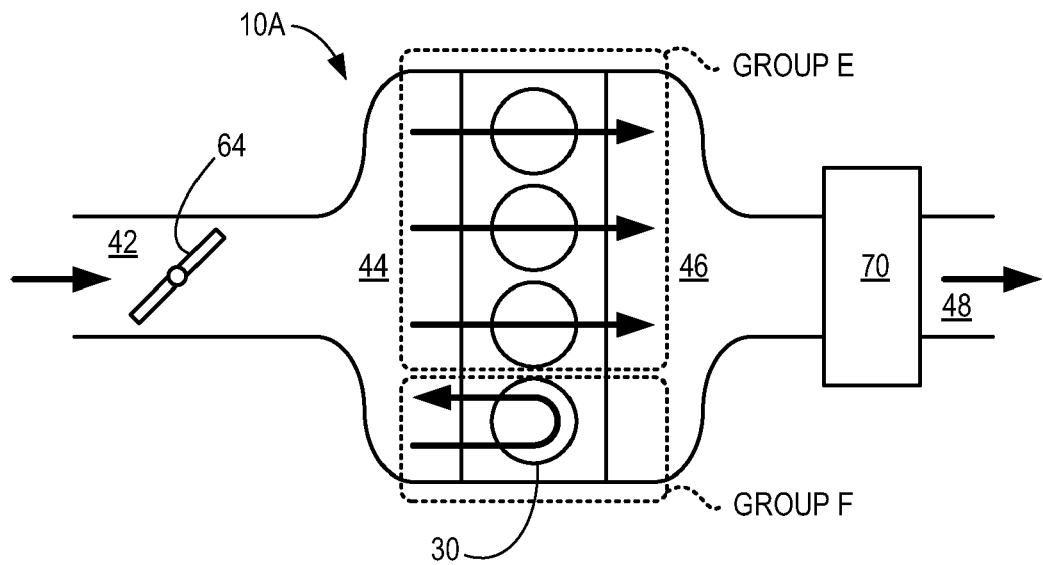

FIG. 1C shows engine 10A as described with reference to FIG. 1A. In this example, a first group of cylinders (Group E) provides a net flow of gases from the intake manifold to the exhaust manifold, while a second group of cylinders (Group F) temporarily traps gases received from the intake manifold, where they are heated within the cylinders of Group F, and are returned to the intake manifold where they may be entrained by the cylinders of Group E.

Furthermore, the cylinders of Group F can further increase the temperature of the gases provided to the intake manifold by performing combustion with these trapped gases. Thus, in some examples, combustion in each cylinder of Group F may be discontinued, while in other examples, combustion may be performed in each cylinder of Group F. In some examples, the cylinders of Group E may utilize at least a portion of the gases supplied to the intake manifold via the cylinders of Group F to perform auto-ignition.

Each of the approaches shown in FIGS. 1A, 1B, and 1C may be used, for example, during part load conditions whereby cylinders of the second group may be used to trap, compress, and heat the cylinder charge, with or without combustion, before pushing these gases back into the intake manifold for use in other cylinders performing auto-ignition. In some embodiments, these cylinders may include electromagnetic or electromechanical valve actuators to allow trapping of cylinder charge until it is desired to be push it back into the intake. Further, the variable timing of the exhaust manifold valves can also be used to transfer hot exhaust gases from the exhaust manifold to the intake manifold. In this way, other cylinders may entrain these gases from the intake manifold to provide charge heating.

Figure 2:
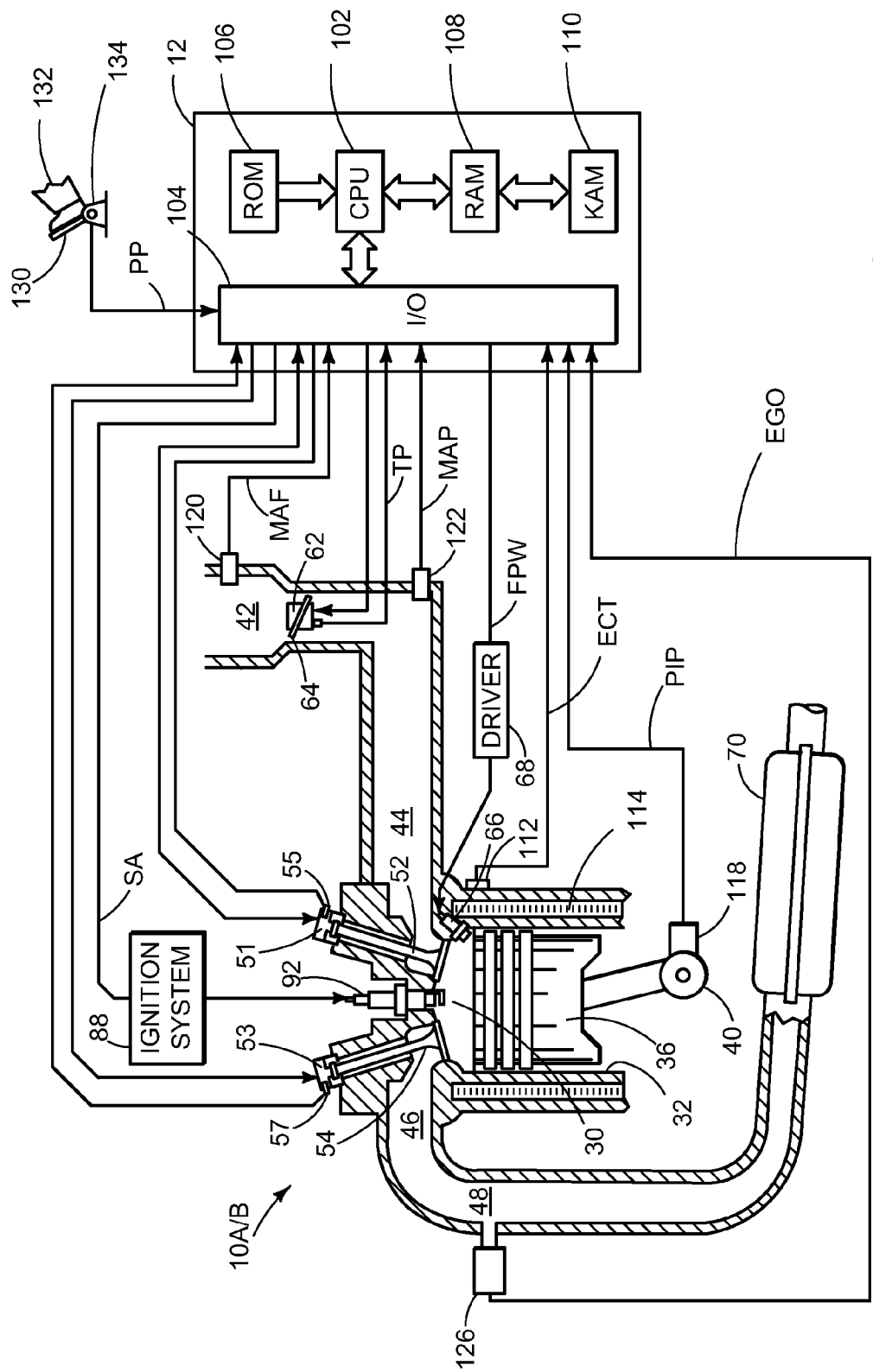
FIG. 2 shows a detailed view of a cylinder of an example engine.

FIG. 2 shows a detailed view of an example cylinder from engines 10A and 10B of FIGS. 1A, 1B, and 1C. As one example, engines 10A and 10B may be included in a propulsion system for a passenger vehicle. Engines 10A and 10B may be controlled at least partially by a control system including controller 12. Controller 12 can receive an input from a vehicle operator 132 via an input device 130. In this example, input device 130 includes an accelerator pedal and a pedal position sensor 134 for generating a proportional pedal position signal PP. Combustion chamber (i.e. cylinder) 30 of engine 10A/B may include combustion chamber walls 32 with piston 36 moveably disposed therein. Piston 36 is coupled to crankshaft 40 so that reciprocating motion of the piston is translated into rotational motion of the crankshaft. Crankshaft 40 may be coupled to at least one drive wheel of the vehicle via an intermediate transmission system. Alternatively, crankshaft 40 may be coupled to a generator for producing electrical energy, for example, where the engine is used in hybrid electric vehicle (HEV) or with generator applications. Further, a starter motor may be coupled to crankshaft 40 via a flywheel to enable starting of the engine.

Combustion chamber 30 may receive intake air from intake passage 42 via intake manifold 44 and may exhaust combustion gases via exhaust manifold 46 during operation where the cylinder provides net flow to the exhaust manifold. However, where the cylinder provides net flow to the intake manifold, exhaust gases produced by combustion chamber 30 or entrained from the exhaust manifold and/or air heated by the combustion chamber walls 32 may be exhausted to intake manifold 44 as will be describe in greater detail with reference to FIG. 4. Intake manifold 44 and exhaust manifold 46 can selectively communicate with combustion chamber 30 via respective intake manifold valve 52 and exhaust manifold valve 54, respectively. In some embodiments, combustion chamber 30 may include two or more intake manifold valves and/or two or more exhaust manifold valves.

Intake manifold valve 52 may be controlled by controller 12 via electromagnetic valve actuator (EVA) 51. Similarly, exhaust manifold valve 54 may be controlled by controller 12 via EVA 53. During some conditions, controller 12 may vary the signals provided to electromagnetic actuators 51 and 53 to control the opening and closing of the respective intake and exhaust manifold valves. The position of intake manifold valve 52 and exhaust manifold valve 54 may be determined by valve position sensors 55 and 57, respectively. In alternative embodiments, one or more of the intake and exhaust manifold valves may be mechanically actuated by one or more cams, and may utilize one or more of cam profile switching (CPS), variable cam timing (VCT), variable valve timing (VVT) and/or variable valve lift (VVL) systems to vary valve opening and closing operation. For example, cylinder 30 may alternatively include an intake manifold valve controlled via EVA and an exhaust manifold valve controlled via cam actuation including CPS and/or VCT. As another example, cylinder 30 may alternatively include an exhaust manifold valve controlled via EVA and an intake manifold valve controlled via cam actuation including CPS and/or VCT.

Fuel injector 66 is shown coupled directly to combustion chamber 30 for injecting fuel directly therein in proportion to the pulse width of signal FPW received from controller 12 via electronic driver 68. In this manner, fuel injector 66 provides what may be referred to as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake manifold 44 in a configuration that provides what may be referred to as port injection of fuel into the intake port upstream of combustion chamber 30, where it may be entrained by the cylinder.

Intake passage 42 may include a throttle 64. In this particular example, the position of throttle 64 may be varied by controller 12 via a signal provided to an electric motor or actuator 62, a configuration that may be referred to as electronic throttle control (ETC). In this manner, throttle 64 may be operated to vary the intake air provided to intake manifold 44. The position of throttle 64 may be provided to controller 12 by a throttle position signal TP. Intake manifold 44 and/or intake passage 42 may include an mass air flow sensor 120 and an air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of the engine may be operated in a compression ignition mode, whereby auto-ignition is performed without an ignition spark. However, in some conditions where auto-ignition is performed, a spark may be used.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may include a three way catalyst (TWC) or NOx trap, among various other emission control devices. In some embodiments, during operation of the engine, emission control device 70 may be periodically reset by operating one or more cylinders of the engine within a particular air/fuel ratio.

Controller 12, as shown in FIG. 2, may be configured as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to the engine, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other suitable type) coupled to crankshaft 40; throttle position (TP) from a throttle position sensor; and absolute manifold pressure signal, MAP, from sensor 122.

Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge or load (including air) inducted into the cylinder. In one example, sensor 118, which is also used as an engine speed sensor, may produce a predetermined number of equally spaced pulses every revolution of the crankshaft.

Thus, FIG. 2 shows only one cylinder of a multi-cylinder engine, and that each cylinder may similarly include its own set of intake/exhaust manifold valves, fuel injector, spark plug, etc.

As one non-limiting example, a first cylinder group of the engine can selectively perform what may be referred to as controlled auto-ignition (CAI), whereby a charge including a mixture of air and fuel is auto-ignited by compression performed by the cylinder's piston without necessarily requiring a spark or a pilot injection to initiate combustion. One particular type of controlled auto-ignition, known as homogeneous charge compression ignition (HCCI), may use a substantially homogeneous mixture of air and fuel to achieve auto-ignition of the cylinder charge. During operation of the cylinder in HCCI mode, the charge can be auto-ignited in various regions of the cylinder simultaneously in contrast to a propagating flame front that typically originates from a spark or a pilot injection.

HCCI may be used to achieve improved engine efficiency and/or reduced engine emissions under some conditions. However, during other conditions, it may be difficult to achieve auto-ignition. As one example shown also in FIG. 3, during lower engine loads and/or lower engine speeds, auto-ignition may be difficult to achieve, whereby a more robust mode such as spark ignition can be used. Thus, one approach to address this issue includes transitioning some or all of the cylinders from HCCI mode to a spark ignition (SI) mode or other suitable mode. However, frequent transitions between HCCI and other modes may result in reduced efficiency and/or increased emissions.

Other approaches have been used to extend HCCI mode into lower engine load and/or lower engine speed regions. As one example, exhaust gases may be recirculated from the exhaust manifold to the intake manifold via an exhaust gas recirculation (EGR) passage arranged external the cylinders. These EGR gases may be used to provide charge heating, whereby the amount of EGR gases supplied to the cylinders may be used to adjust the timing of auto-ignition. In this way, HCCI mode operation may be extended. However, this approach utilizes additional hardware including EGR passages, EGR valves, and additional control systems.

Still other approaches have been used to extend HCCI mode into lower engine load and/or lower engine speed regions. For example, some of the cylinders may be deactivated, whereby combustion in the cylinder is discontinued. Thus, the amount of torque produced by the other cylinders may be increased to enable lower load auto-ignition operation. However, this approach may only extend auto-ignition operation so far and may not enable auto-ignition during lower temperature conditions, such as after start-up or during lower ambient air temperature conditions.

Figure 3:
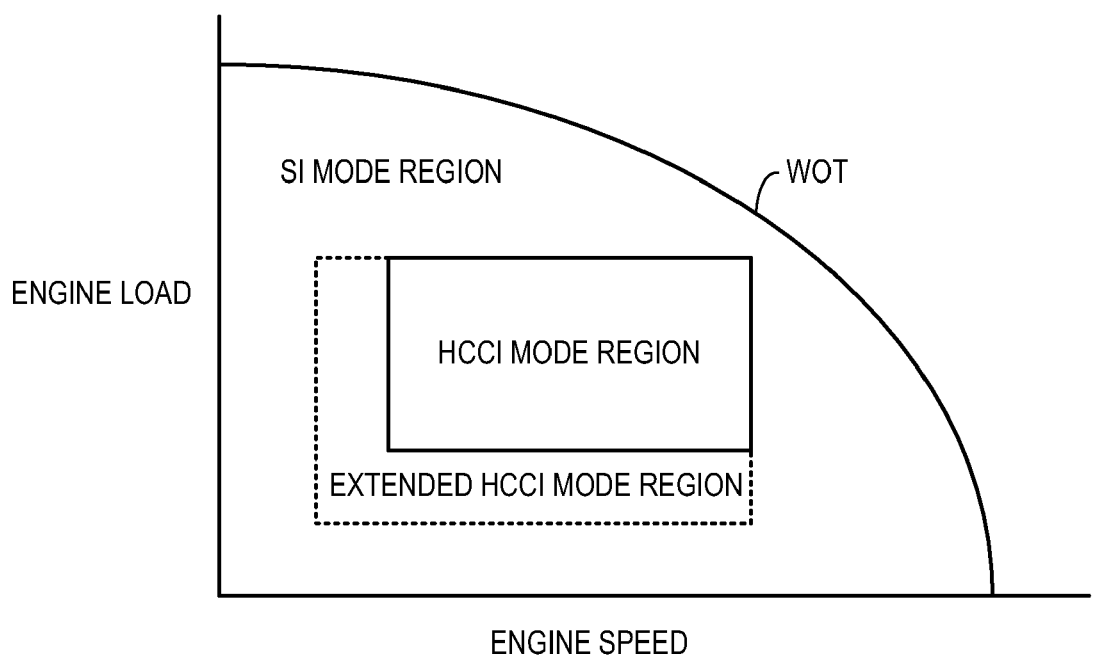
FIG. 3 shows an example mode map for an engine.

FIG. 3 shows an example mode map for an engine that may be stored in memory of controller 12, for example. In this particular example, the map includes a comparison of engine speed as indicated by the horizontal axis and engine load as indicated by the vertical axis. Note that the map stored in controller 12 may include operating conditions other than engine speed or engine load. The operating region of the engine is bounded by a wide open throttle (WOT) curve. While the map of FIG. 3 may be used to describe the operating mode regions of the engine, it also may be used to describe the operating mode regions on an individual cylinder basis. Within the region bounded by the horizontal axis, vertical axis, and WOT curve are the SI mode region, HCCI mode region, and the extended HCCI mode region.

Located within the operating region of the engine, is the HCCI region. As shown in the FIG. 3, the HCCI mode region may omit higher engine loads and speeds and lower engine loads and speeds since auto-ignition may be difficult to achieve in these operating regions. Surrounding the HCCI mode region is the SI mode region where the more robust spark ignition mode may be used in place of HCCI to achieve reliable combustion. Note that SI mode may be performed within the HCCI mode region, under some conditions.

The extended HCCI mode region shown in FIG. 3 indicates the operating region where HCCI may be performed by a first cylinder group by providing net flow of exhaust gases or heated air from a second cylinder group to the intake manifold of the first cylinder group, as will be described in greater detail with reference to FIGS. 4-6. It should be appreciated that the map of FIG. 3 including the extended HCCI mode region may be used to explain operation of the engine as a whole, of the first cylinder group, or of a single cylinder of the first cylinder group.

Figure 4:
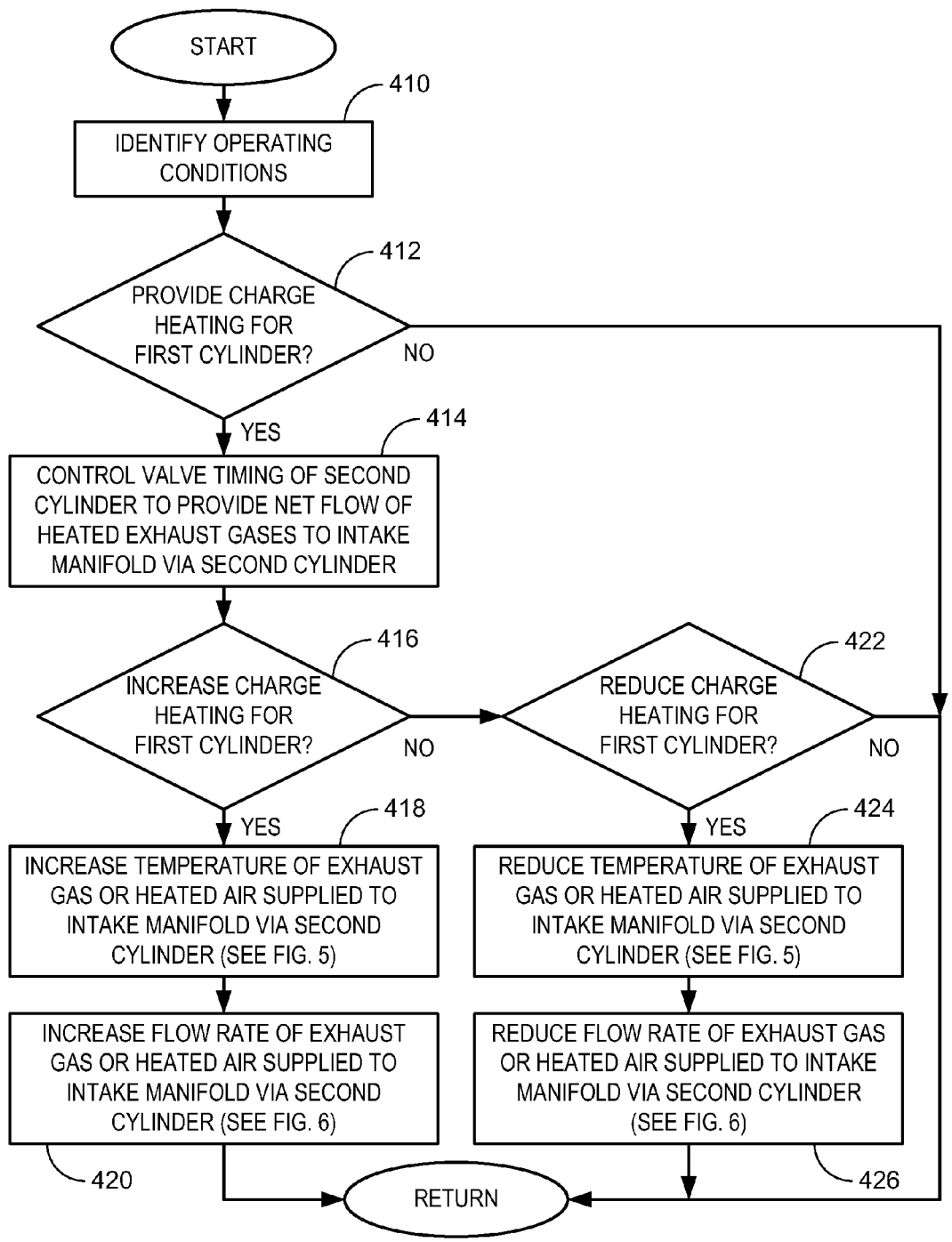
FIG. 4 shows a high level flow chart depicting an example engine control strategy.

FIG. 4 shows a high level flow chart depicting an example engine control strategy that may be used to control the level of charge heating provided to the first cylinder group by varying an amount (e.g. flow rate) and/or temperature of exhaust gases or heated intake air that is provided to the intake manifold of the first cylinder group via at least another cylinder of a second cylinder group. For example, as shown in FIGS. 1A, 1B, and 1C, the first and second cylinder groups may each include one or more cylinders.

At 410, the operating conditions may be identified including past, present, and/or future conditions of the engine system. As described herein, operating conditions may include engine load, engine speed, engine temperature, intake air temperature, ambient air temperature, ambient air pressure, intake manifold pressure, exhaust manifold pressure, air/fuel ratio, spark timing, valve timing, valve position, throttle position, transmission state, accelerator pedal position, brake pedal position, combustion state of each cylinder, and level of boost provided by a boosting device such as a turbocharger or supercharger, among other operating conditions.

At 412, it may be judged whether to provide charge heating to at least a first cylinder of the first cylinder group. While the routine of FIG. 4 will be described with reference to a first cylinder and a second cylinder, these approaches for providing charge heating may be similarly applied to all cylinders of the first cylinder group and all cylinders of the second cylinder group, whereby each group includes one or more cylinders.

As one example, it may be judged that the charge heating is to be provided to the first cylinder when the operating conditions indicate that auto-ignition may be difficult to achieve without additional heating of the cylinder charge. For example, the control system may reference the map of FIG. 3 and/or FIG. 14 stored in memory to identify whether to provide charge heating for the first cylinder. As indicated by the map of FIG. 3 and/or 14, charge heating may be performed for the first cylinder when the engine speed and/or engine load are below a threshold and the first cylinder is to carry out combustion by auto-ignition. For example, when the operating conditions of the engine correspond to the extended HCCI mode region, charge heating of the cylinders carrying out HCCI may be initiated. However, charge heating may be initiated for the first cylinder and other cylinders of the first cylinder group even when HCCI is not to be performed. For example, the first cylinder may be operated in other suitable modes including SI mode where charge heating is used.

If the answer at 412 is no, the routine may return to 410. Alternatively, if the answer at 412 is yes, the valve timing of the second cylinder may be controlled at 414 to provide a net flow of heated exhausted gases to the intake manifold of the first cylinder. Additionally or alternatively, the second cylinder may be operated to temporarily trap intake air form the intake manifold where it may be heated by the cylinder via heat transfer from the cylinder walls and/or via combustion, where it may then be released back into the intake manifold. For example, as shown in FIG. 1A, the cylinder of Group B can provide net flow of exhaust gases to intake manifold 44 from exhaust manifold 46, where these exhaust gases may be entrained by the cylinders of Group A, thereby increasing their charge temperature. As another example, as shown in FIG. 1B, a cylinder of Group D can provide net flow of exhaust gases to intake manifold 44A from exhaust manifold 46A or to intake manifold 44B from exhaust manifold 46B depending on the particular cylinder bank. As yet another example, as shown in FIG. 1C, the intake manifold gases may be trapped, heated, and released back into the intake manifold. Thus, it should be appreciated that the second cylinder may be selected such that at least one valve of the second cylinder communicates with the intake manifold of the first cylinder.

In some embodiments, the operation at 414 may also include adjusting the position of throttle 64 and/or a level of boost provided by a boosting device to vary the intake manifold pressure. Similarly, where the exhaust passage of the engine includes a throttle valve and/or a variable geometry turbine, the position of the exhaust throttle and/or turbine actuator may be adjusted to vary the exhaust manifold pressure. In this way, the pressure difference across the engine between the intake and exhaust manifolds may be controlled to enable at least a second cylinder to provide net flow of exhaust gases from the exhaust manifold to the intake manifold.

At 416, it may be judged whether to increase the charge heating for the first cylinder. As one example described with reference to FIG. 17, charge heating may be increased to advance auto-ignition timing or to enable auto-ignition via the first cylinder. If the answer at 416 is yes, operating parameters of at least the second cylinder may be adjusted at 418 to increase the temperature of the exhaust gases or heated air supplied to the intake manifold via the second cylinder. Alternatively or additionally, operating parameters of at least the second cylinder may be adjusted at 420 to increase the flow rate of the exhaust gases or heated air supplied to the intake manifold via at least the second cylinder. Finally, the routine may return.

Alternatively, if the answer at 416 is no, (i.e. charge heating for the first cylinder is not to be increased), the routine may proceed to 422. At 422, it may be judged whether to reduce the charge heating for the first cylinder. If the answer at 422 is yes, operating parameters of at least the second cylinder may be adjusted at 424 to reduce the temperature of the exhaust gases or heated air supplied to the intake manifold via the second cylinder. Alternatively or additionally, operating parameters of at least the second cylinder may be adjusted at 426 to reduce the flow rate of the exhaust gases or heated air supplied to the intake manifold via at least the second cylinder. Finally, the routine may return. Adjustments to the temperature and/or flow rate of exhaust gases or heated air provided to the intake manifold will be described in greater detail with reference to FIGS. 5 and 6.

Figure 5:
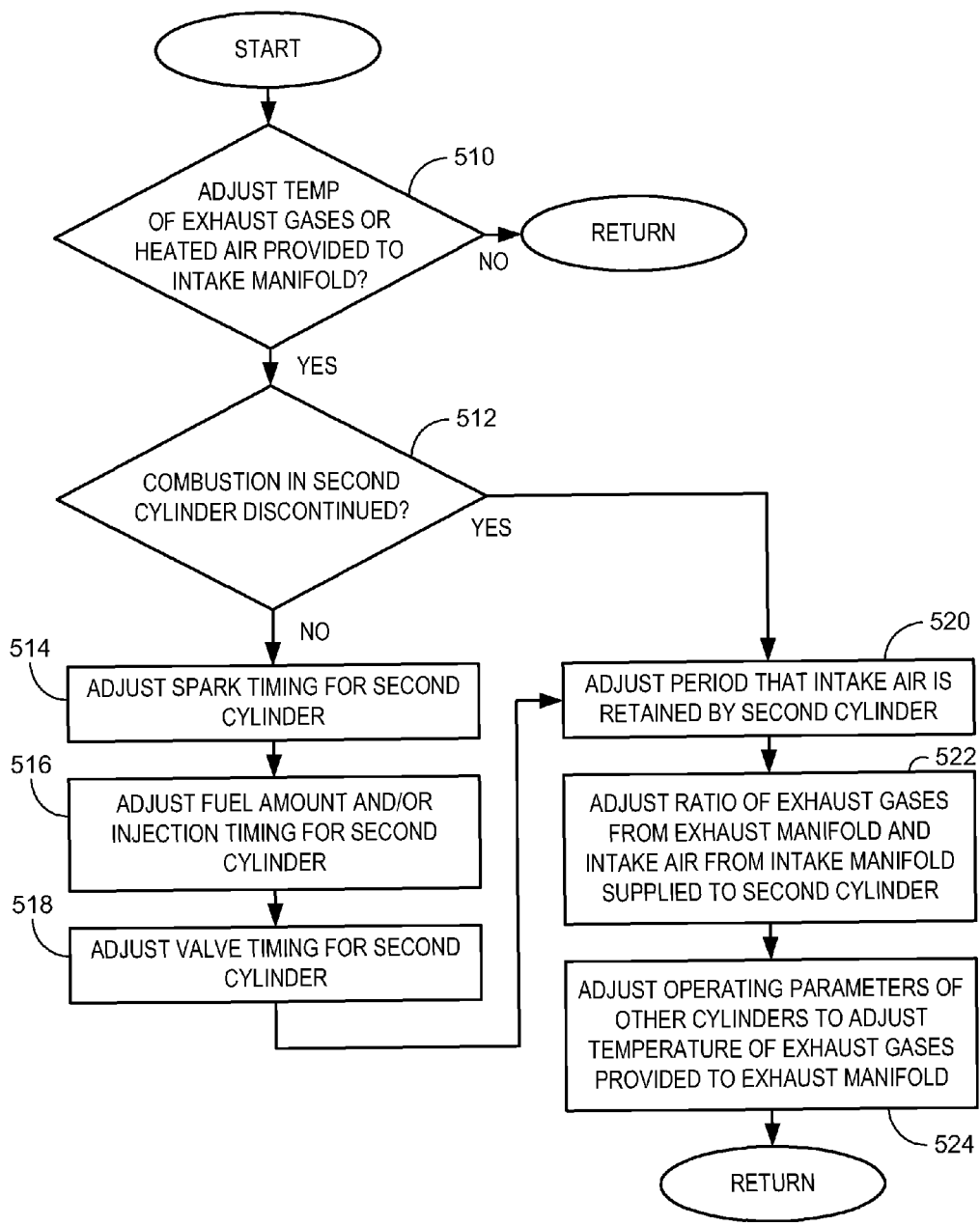
FIG. 5 shows a flow chart depicting an example engine control strategy for varying the temperature of exhaust gases or heated air that is provided to the intake manifold via at least one cylinder.

FIG. 5 shows a flow chart depicting an example engine control strategy that may be used to adjust the temperature of gases including exhaust gases and/or heated intake air supplied to the intake manifold via at least the second cylinder. At 510, it may be judged whether the temperature of the exhaust gases or heated intake air provided to the intake manifold should be adjusted. The temperature of the exhaust gases or heated air provided to the intake manifold may be increased where additional charge heating is requested in response to operating conditions and/or the operating mode of the other cylinders, for example, as directed by FIGS. 3 and 14. If the answer at 510 is no, the routine may return. Alternatively, if the answer at 510 is yes, it may be judged whether combustion in the second cylinder is discontinued. The decision of whether to discontinue combustion in a cylinder will be described in greater detail with reference to FIG. 15.

If the answer at 512 is no (i.e. the second cylinder is carrying out combustion), one or more of operations 514-524 may be performed. For example, at 514, spark timing may be adjusted for the second cylinder. As one example, to increase the temperature of the exhaust gases provided by the second cylinder to the intake manifold, the spark timing may be retarded. At 516, the amount of fuel and/or the fuel injection timing for the second cylinder may be adjusted. For example, late injection or secondary injections of fuel may be performed to increase the temperature of the exhaust gases produced by the second cylinder. At 518, the valve timing for the second cylinder may be adjusted. For example, the intake manifold valve of the second cylinder may be opened earlier such as during combustion to increase the heat transfer to the intake manifold. At 520, the period that the gases are retained by the second cylinder may be adjusted to vary the temperature of the exhaust gases and/or heated air that is supplied to the intake manifold by the second cylinder. For example, where combustion has been discontinued in the second cylinder, the period of time that the intake air and/or exhaust gases are retained by the second cylinder may be adjusted to increase or decrease the heat transfer from the cylinder walls to the trapped gases before exhausting it to the intake manifold via the intake manifold valve.

At 522, the ratio of exhaust gases from the exhaust manifold and intake air from the intake manifold that are trapped by the second cylinder may be adjusted by varying valve timing and/or lift to vary the temperature of the resulting mixture of these gases that are exhausted to the intake manifold via the intake manifold valve. For example, to increase the temperature of the mixture exhausted to the intake manifold by the second cylinder, the amount of exhaust gases received by the second cylinder from the exhaust manifold may be increased relative to the amount of intake air received from the intake manifold. However, the ratio of these gases may be limited where combustion is performed in the second cylinder. For example, where the exhaust gases do not include sufficient oxygen to enable combustion, additional intake air may be entrained by the second cylinder. At 524, operating parameters of other cylinders such as described with reference to 514-522 for the second cylinder may be adjusted to vary the temperature of the exhaust gases provided to the exhaust manifold by these other cylinders. For example, spark retard and/or late injection timing may be used to increase the temperature of the exhaust gases produced by the first cylinder or other cylinder providing net flow to the exhaust manifold, where these exhaust gases of increased temperature may be entrained by the second cylinder and ultimately exhausted back into the intake manifold via the intake manifold valve of the second cylinder.

Alternatively, if the answer at 512 is yes (i.e. combustion in the second cylinder is discontinued), then one or more of 520-524 may be performed. Finally, the routine may return. In this way, charge heating for at least the first cylinder of the first cylinder group may be increased by increasing the temperature of the exhaust gases or heated air that are supplied to the intake manifold via the second cylinder.

Figure 6:
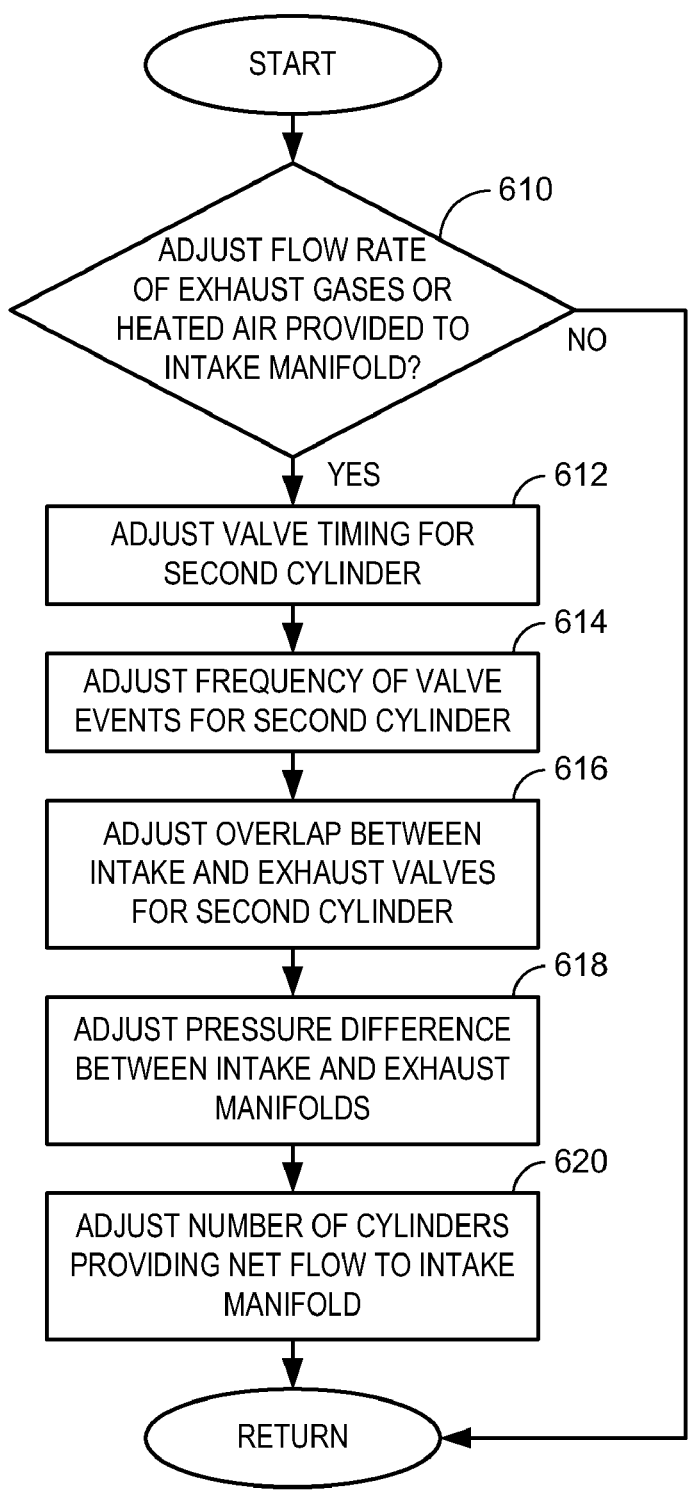
FIG. 6 shows a flow chart depicting an example engine control strategy for varying the flow rate of exhaust gases or heated air that is provided to the intake manifold via at least one cylinder.

FIG. 6 shows a flow chart depicting an example engine control strategy that may be used to adjust the mass flow rate of exhaust gases or heated air supplied to the intake manifold. At 610, it may be judged whether the flow rate of the exhaust gases or heated intake air provided to the intake manifold is to be adjusted. The flow rate of the exhaust gases or heated air provided to the intake manifold may be increased where additional charge heating is requested in response to operating conditions and/or the operating mode of the other cylinders, for example, as directed by FIG. 14. If the answer at 610 is no, the routine may return. Alternatively, if the answer at 610 is yes, one or more of operations 612-620 may be performed to increase the flow rate of exhaust gases and/or heated intake air to the intake manifold.

Figure 9:
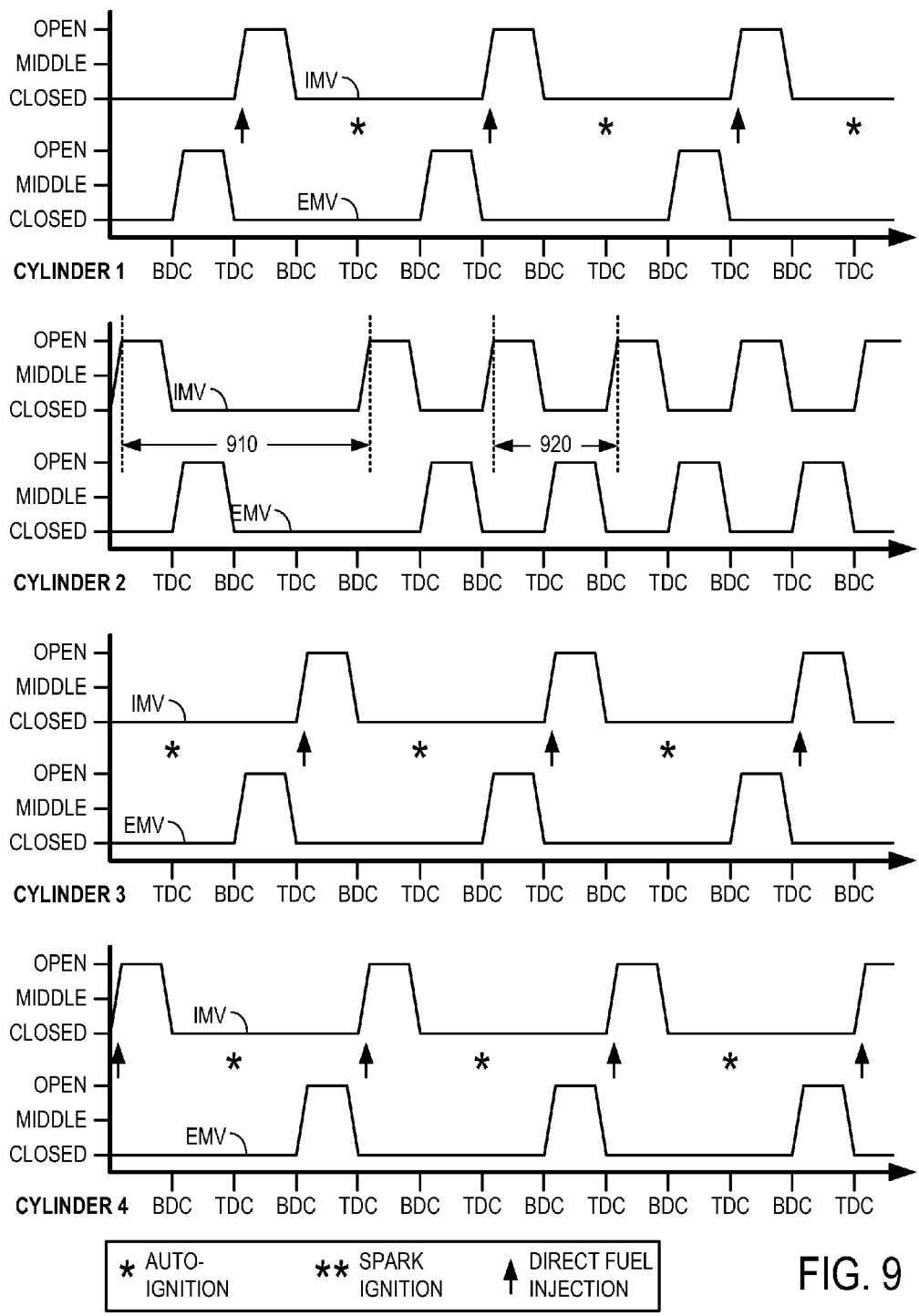
Figure 10:
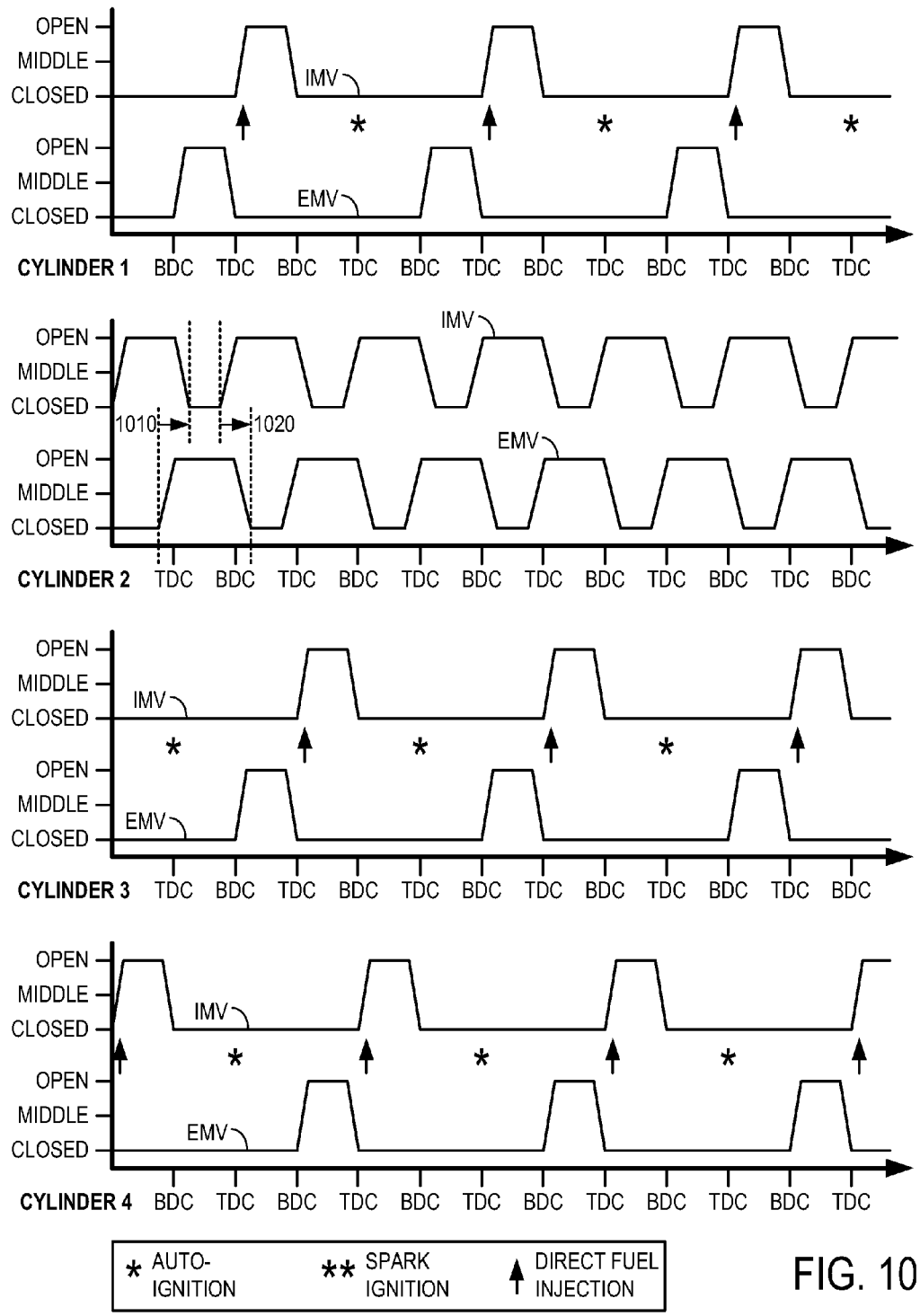

At 612, the valve timing for at least the second cylinder may be adjusted, for example, to permit more or less flow of gases to the intake manifold. At 614, the frequency of the valve events (e.g. pumping events) performed by the second cylinder during a cycle of the first cylinder may be adjusted to increase or decrease the flow rate of gases provided to the intake manifold. For example, as shown in FIG. 9, the flow rate of gases to the intake manifold may be increased by performing valve opening and closing events more frequently. At 616, the overlap between intake and exhaust manifold valves for the second cylinder may be adjusted to vary the net flow rate of gases to the intake manifold from the exhaust manifold. For example, as shown in FIG. 10, the valve overlap may be increased to increase the flow rate or decreased to reduce the flow rate.

At 618, the pressure difference between the intake manifold and the exhaust manifold may be adjusted to vary flow rate of exhaust gases to the intake manifold from the exhaust manifold. For example, the intake throttle position, level of boost provided by a boosting device, a geometry of the exhaust turbine, and/or an exhaust throttle position may be adjusted to vary the pressure difference between the intake and exhaust manifolds. In some conditions, the flow rate of exhaust gases to the intake manifold via the second cylinder may be increased by increasing the pressure of the exhaust manifold relative to the intake manifold.

At 620, the number of cylinders providing gases to the intake manifold may be adjusted. For example, where the second cylinder is operated to provide heated gases to the intake manifold and an increased flow rate is requested, operating parameters of a third cylinder may be adjusted to provide heated gases to the intake manifold, thereby increasing the net flow rate of exhaust gases and/or heated intake air to the intake manifold. Conversely, if the flow rate is to be reduced and the second cylinder is providing gases to the intake manifold, then operating parameters of the second cylinder can be adjusted to provide net flow of gases to the exhaust manifold rather than the intake manifold. Thus, the flow rate of exhaust gases or heated intake air that is provided to the intake manifold may be reduced by reducing the number of cylinders of the second group.

In this way, heat may be added to the air entrained from the intake manifold of the first cylinder by operating at least another cylinder to provide net flow of exhaust gases or heated intake air to the intake manifold of the first cylinder. The temperature of the charge formed in the first cylinder may be controlled by adjusting the mass flow rate and/or temperature of these gases provided to the intake manifold of the first cylinder of the first cylinder group via one or more other cylinders of the second cylinder group. Thus, exhaust gases or heated intake air may be recirculated to the first cylinder without requiring additional hardware such as EGR passages or EGR valves. However, it should be appreciated that the approaches described herein may be used with EGR hardware to provide additional charge heating in addition to the heating provided by the second cylinder group.

FIGS. 7-13 show example timing diagrams further illustrating the various approaches described herein. While these timing diagrams depict a four cylinder engine, for example, as shown in FIG. 1A, it should be appreciated that these approaches may be applied to engine having other number of cylinders. As one example, the timing diagrams shown in FIGS. 7-13 may be applied to each bank of an eight cylinder engine, for example, as shown in FIG. 1B.

The timing diagram for each of cylinders 1-4 includes a horizontal axis providing an indication of piston position of the cylinder, which may also be indicative of time. In each of FIGS. 7-13, TDC refers to a piston position of top dead center and BDC refers to a piston position of bottom dead center for the respective cylinder. Furthermore, IMV refers to an intake manifold valve and EMV refers to an exhaust manifold valve of the cylinder. For each of the intake and exhaust manifold valves, the position of the valve is indicated on the timing diagram as open or closed. While a middle position or partially opened condition of the valves is shown, it should be appreciated that the following disclosure is not limited to valves that have a middle position. Further still, direct fuel injection, spark ignition, and autoignition timing are also shown as the symbols indicated by the key.

Figure 7:
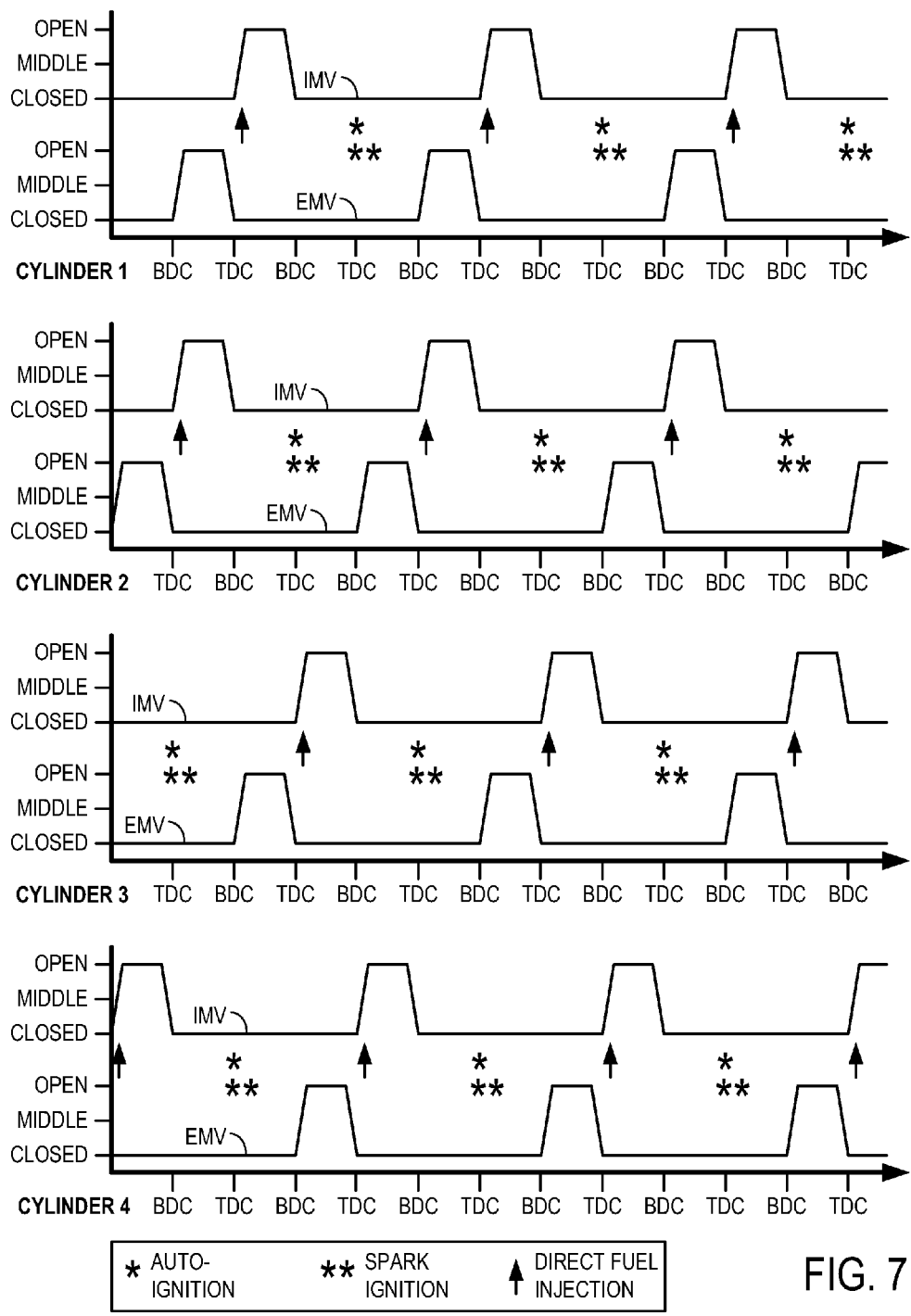
FIGS. 7-13 show timing diagrams for an example engine.

Referring specifically to FIG. 7, each of cylinders 1, 2, 3, and 4 are repetitively carrying out combustion with a firing order of Cylinder 1, Cylinder 3, Cylinder 4, and Cylinder 2. However, in some embodiments, other suitable firing orders may be used. As one example, each of cylinders 1, 2, 3, and 4 are operating in a four stroke mode including intake, compression, power, and exhaust strokes. In the example shown in FIG. 7 combustion may be initiated by spark ignition or auto-ignition. For example, where the operating conditions are within the HCCI mode region of the map shown in FIG. 3, cylinders 1-4 can perform HCCI whereby the charge is auto-ignited at the appropriate timing. As another example, where the operating conditions are within the SI mode region of the map shown in FIG. 3, cylinders 1-4 can perform SI whereby the charge is spark ignited at the appropriate timing.

Regardless of whether the cylinders are carrying out combustion in SI or HCCI mode, each of the cylinders are providing net flow from the intake manifold to the exhaust manifold in the example of FIG. 7. For example, for each of cylinders 1-4, at least one intake manifold valve is opened and closed to admit air into the cylinder from the intake manifold. The cylinder is then fueled by direct injection where it is combusted by one of spark ignition or auto-ignition depending on the operating conditions. Finally, at least one exhaust manifold valve is opened and closed to release exhaust gases from the cylinder into the exhaust manifold. In this way, each of the cylinders are providing a net flow from the intake manifold to the exhaust manifold of the engine.

Figure 8:
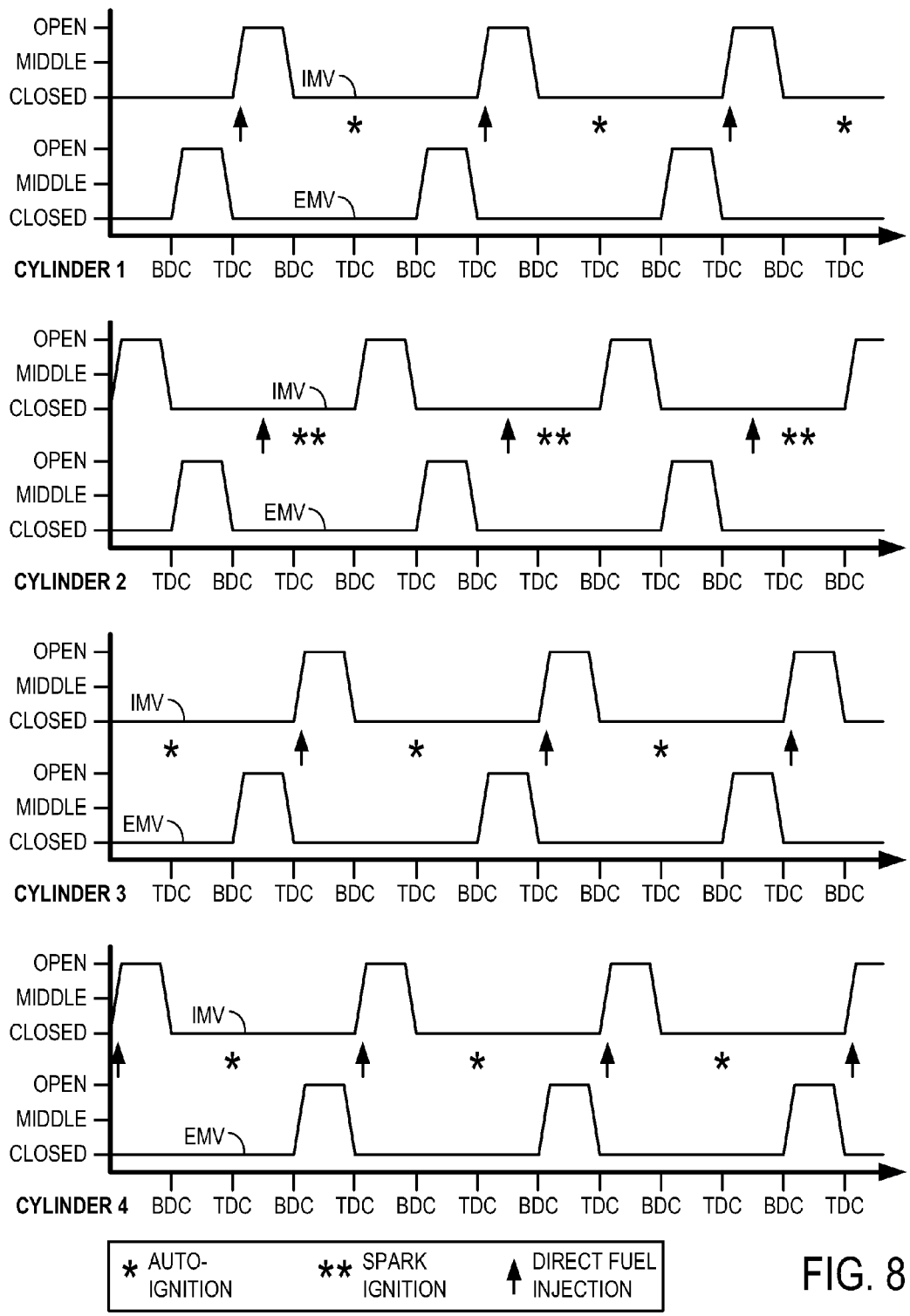

In contrast, FIG. 8 shows a timing diagram depicting the cylinder charge heating approach shown in FIG. 1A or for one of banks 14a or 14b as shown in FIG. 1B. The firing order in the example shown in FIG. 8 is the same as the example shown in FIG. 7. However, cylinder 2 is providing net flow from the exhaust manifold to the intake manifold. Cylinders 1, 3, and 4 are providing net flow from the intake manifold to the exhaust manifold, for example, as shown in FIG. 1A, while repetitively carrying out combustion. Cylinder 2 is able to transfer exhaust gases produced by other cylinders from the exhaust manifold to the intake manifold by opening and closing the exhaust manifold valve to admit air to the cylinder and subsequently opening and closing the intake manifold valve to release exhaust gases from the cylinder.

Cylinder 2 in this example is carrying out combustion by spark ignition, while cylinders 1, 3, and 4 are carrying out combustion by auto-ignition to perform HCCI mode. Thus, the exhaust gases entrained by Cylinder 2 from the exhaust manifold via the exhaust manifold valve typically contain oxygen in order to achieve combustion. As such, during the operation shown in FIG. 8, some of the cylinders providing net flow from the intake manifold to the exhaust manifold may be operated with a lean air/fuel ratio to provide increased oxygen to the exhaust manifold. As one example, the operation shown in FIG. 8 may be performed when the operating conditions are within the extended HCCI mode region shown in FIG. 3. In some embodiments, Cylinder 2 may discontinue carrying out combustion while providing net flow of gases from the exhaust manifold to the intake manifold, for example, as shown in FIG. 9.

Furthermore, the amount of heat or temperature of the exhaust gases supplied to the intake manifold by Cylinder 2 can be controlled by varying the valve timing, amount of fuel injected, the timing of fuel injection, and/or the spark timing. For example, by retarding the spark timing, the amount heat produced by Cylinder 2 may be increased. Similarly, by retarding the injection timing, or by providing a second late injection of fuel, the temperature of the exhaust gases provided to the intake manifold may be increased. In this way, one or more cylinders of a second cylinder group such as Cylinder 2 can provide net flow of exhaust gases from the exhaust manifold to the intake manifold of a first cylinder group to provide increase charge heating, thereby enabling the HCCI mode region to be extended without changing the firing order of the cylinders.

FIG. 9 shows another example where at least one cylinder of the engine is operated to provide net flow of exhaust gases from the exhaust manifold to the intake manifold of cylinders carrying out combustion by auto-ignition. However, the example shown in FIG. 9 differs from the example of FIG. 8 as Cylinder 2 is not carrying out combustion. In other words, Cylinder 2 is deactivated in the example of FIG. 8. Thus, during deactivation of the cylinder, fueling of Cylinder 2 and spark can be discontinued.

Since Cylinder 2 of the second cylinder group is operated to provide net flow of exhaust gases from the exhaust manifold to the intake manifold while not carrying out combustion, the amount (e.g. mass flow rate) of exhaust gases provided to the intake manifold by Cylinder 2 can be controlled by varying the frequency of the valve events with reference to the cycle of other cylinders of the engine. For example, during a first condition where less charge heating is to be provided to other engine cylinders, Cylinder 2 can be operated with a greater period between valve events as indicated at 910. As one example, Cylinder 2 can be operated in a four stroke mode with Cylinders 1, 3, and 4. During a second condition where greater charge heating is to be provided to other engine cylinders, Cylinder 2 can be operated with a smaller period between valve events as indicated at 920. For example, Cylinder 2 can be operated in a two stroke mode, while Cylinders 1, 3, and 4 may be operated in a four stroke mode. Thus, by varying the frequency of the intake and exhaust manifold valve opening and closing events, the flow rate of exhaust gases from the exhaust manifold to the intake manifold can be controlled, thereby adjusting the amount of charge heating provided to other engine cylinders.

FIG. 10 shows yet another example where at least one cylinder of the engine is operated to provide net flow of exhaust gases from the exhaust manifold to the intake manifold, where it can be entrained by other cylinders of the engine, for example, during extended HCCI mode operation. The example of FIG. 10 is similar to the example of FIG. 9 in that combustion by Cylinder 2 is discontinued while the intake and exhaust manifold valves are operated to provide net flow of exhaust gases to the intake manifold from the exhaust manifold. The difference between the example of FIG. 10 and the example of FIG. 9 includes the use of valve overlap in FIG. 10 to allow exhaust gases to flow from the exhaust manifold to the intake manifold, at least where the exhaust manifold pressure is greater than the intake manifold pressure.

As one example, where the exhaust manifold pressure is greater than the intake manifold pressure, at least one exhaust manifold valve and at least one intake manifold valve of Cylinder 2 may be opened simultaneously to allow exhaust gases to flow from the exhaust to the intake manifold. The amount of overlap indicated by 1010 and 1020 can be adjusted to control the flow rate of exhaust gases from the exhaust manifold to the intake manifold. For example, the overlap at 1010 and/or 1020 can be increased to increase the flow rate of exhaust gases. Further, the pressure difference between the intake and exhaust manifolds may be adjusted in a variety of ways to provide yet another way of controlling exhaust gas flow rate. For example, intake throttling, exhaust throttling, boosting, and/or variable turbine geometry may be adjusted to vary the pressure difference between the intake and exhaust manifolds.

Figure 11:
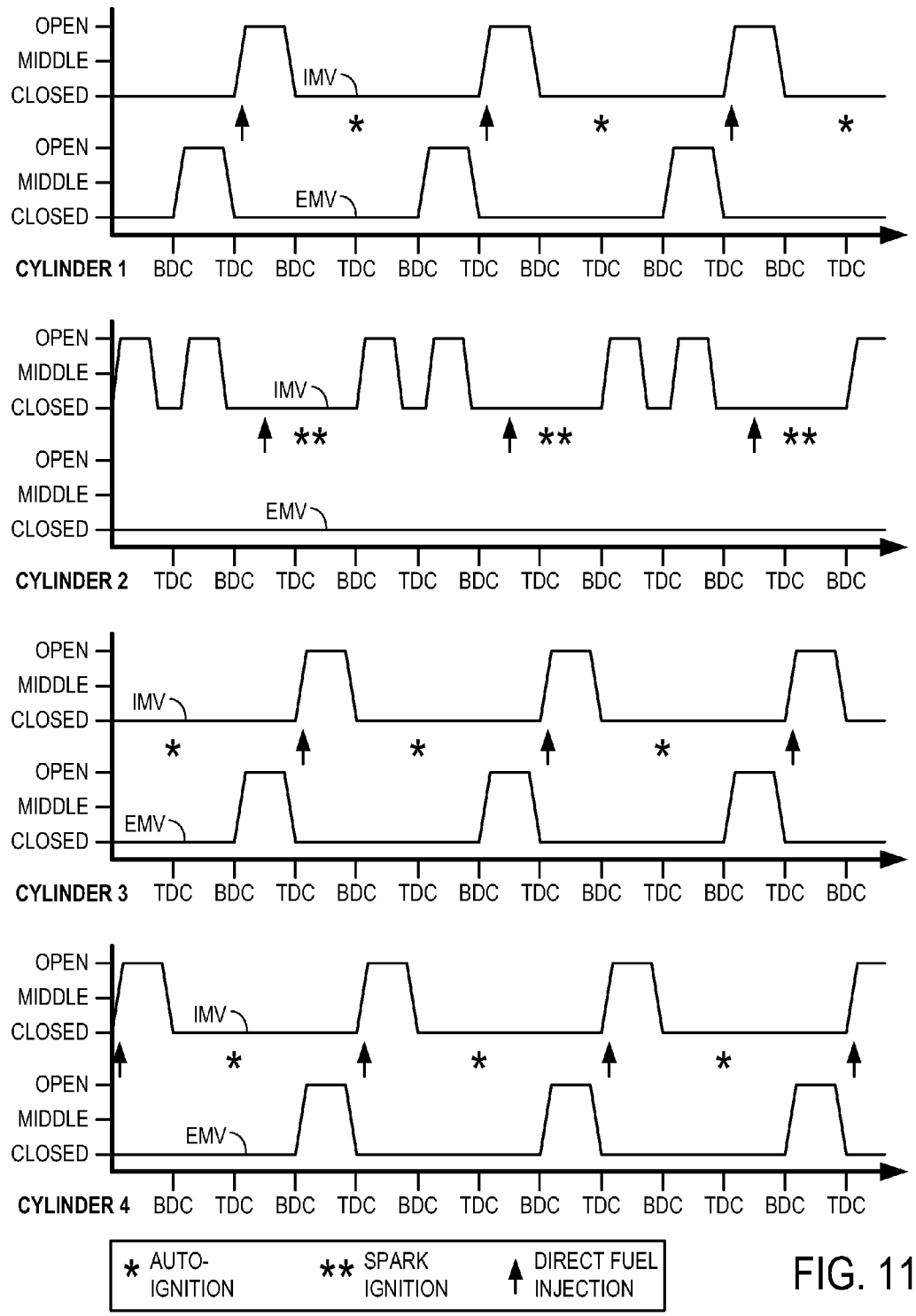

FIG. 11 shows yet another example where at least one cylinder of the engine is operated to provide charge heating for other engine cylinders. In this example, also shown in FIG. 1C, at least one cylinder such as Cylinder 2 can be operated to receive air from the intake manifold via an intake manifold valve where it may be heated by the walls of Cylinder 2 and/or by combustion performed by Cylinder 2 before it is exhausted into the intake manifold via the intake manifold valve. In this example, the exhaust manifold valves remain closed. The approaches described with reference to FIG. 8 may be used to increase the temperature of the exhaust gases. For example, spark timing and fuel delivery timing and quantity can be adjusting to vary the temperature of exhaust gases produced by Cylinder 2.

Figure 12:
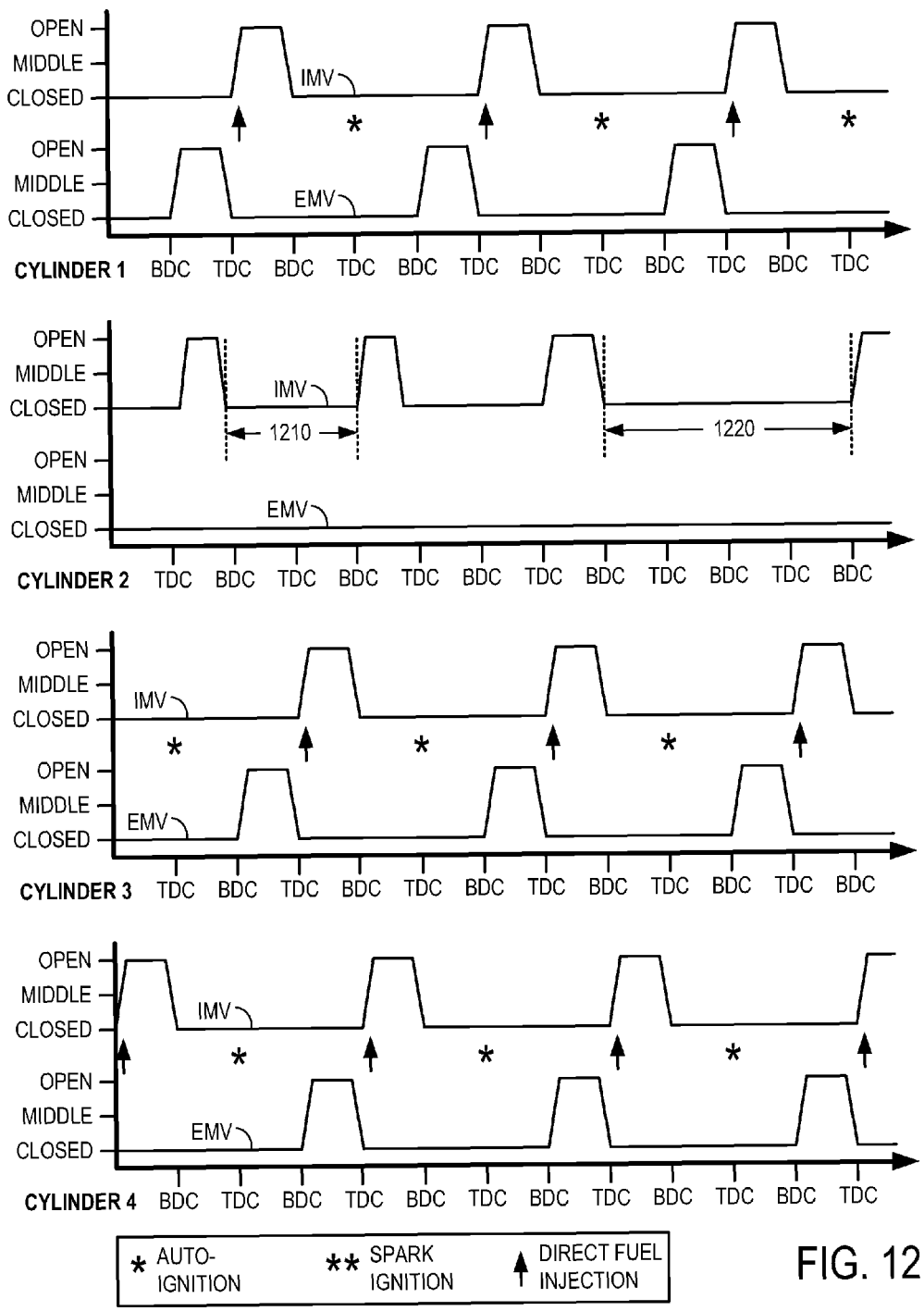

However, as shown in FIG. 12 and also in FIG. 1C, combustion may be discontinued in Cylinder 2, for example, as described with reference to FIGS. 9 and 10, whereby the intake manifold valve can be operated to admit intake air into Cylinder 2 from the intake manifold where it is trapped and heated by the cylinder walls before being exhausted back into the intake manifold. In this example, the exhaust manifold valves remain closed.

As shown in FIG. 12, the period that air is retained or trapped by the cylinder may be adjusted to vary the amount of heating provided to the air admitted into the cylinder. For example, where a lower amount of charge heating is requested, the period may be shorter as indicated at 1210, while during other conditions such as where a greater level of charge heating is requested, the period may be longer as indicated at 1220. By varying the period by which the air is retained within the cylinder, the temperature of the intake air exhausted to the intake manifold may be adjusted. Furthermore, the amount of air retained by the cylinder may be controlled by adjusting valve timing to vary the flow rate of heated air that is exchanged between Cylinder 2 and the intake manifold. Thus, both the flow rate and temperature of the air heated by Cylinder 2 may be controlled.

Figure 13:
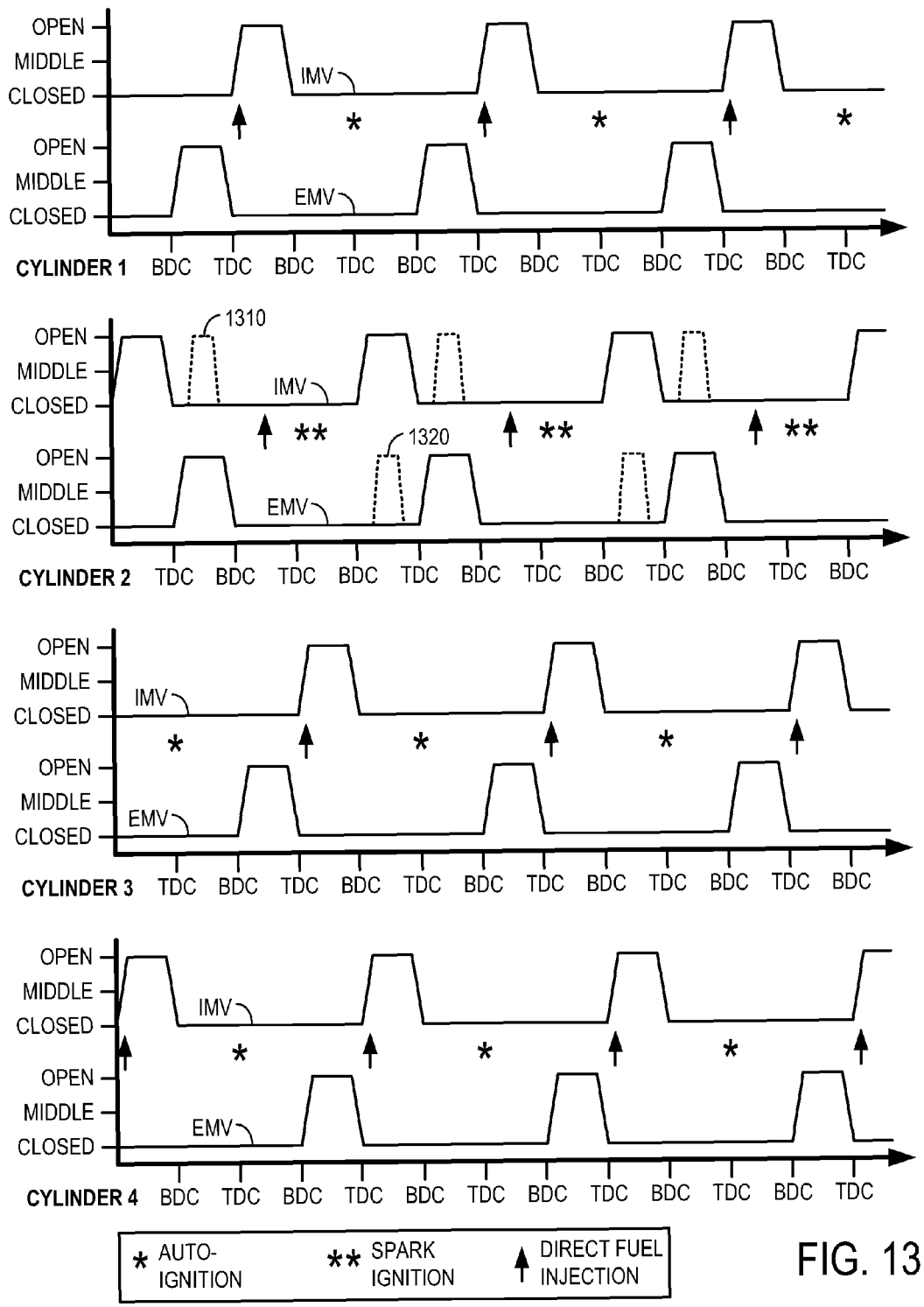

Still other examples are possible. FIG. 13 shows an example where the approaches of FIG. 8 and FIG. 11 are combined to provide additional control over the flow rate and temperature of the exhaust gases provided to the intake manifold. For example, as indicated by 1210, the intake manifold valve may be operated in addition to the exhaust manifold valve to vary the contribution of air received from the intake manifold and exhaust gases received from the exhaust manifold. Similarly, as indicated by 1220, the exhaust manifold valve may be operated in addition to the intake manifold valve to vary the contribution of air received from the intake manifold and exhaust gases received from the exhaust manifold. In this way, combustion may be performed by Cylinder 2 even where the exhaust gases received from the exhaust manifold do not contain excess oxygen, such as where the other cylinders that provide net flow of exhaust gases to the exhaust manifold are operated at stoichiometry or rich of stoichiometry. Note that this approach may be performed without combustion, for example, to combine the approaches of FIGS. 9, 10, and 12.

Figure 14:
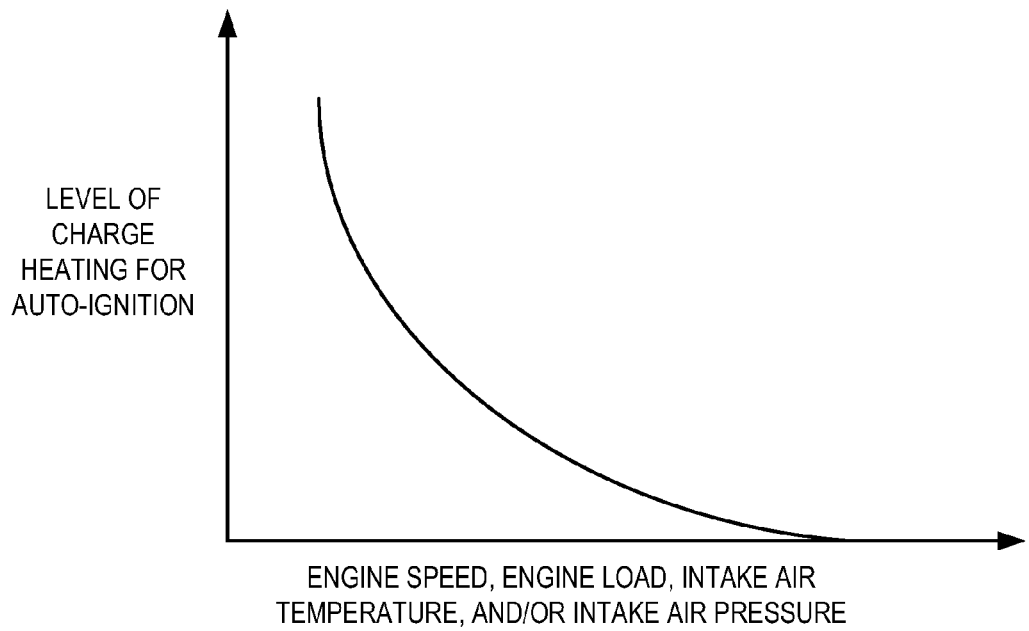
FIG. 14 is a graph depicting an example of how the level of charge heating provided to cylinders performing auto-ignition may be varied responsive to operating conditions.

FIG. 14 is a graph showing the level of charge heating that may be provided to cylinders of the first cylinder group by the second cylinder group with varying engine speed and/or load to achieve auto-ignition. As shown in FIG. 14, the amount of charge heating may decrease with increasing engine load and/or speed, at least during the extended HCCI region shown in FIG. 3. For example, at 412 of FIG. 4 where it is judged whether to perform charge heating, the control system may reference a look-up table or map as described by FIG. 14 stored in memory of the controller. Note that the level of charge heating may vary with other operating conditions other than engine load and speed, and may be negatively correlated with some of these operating conditions.

Figure 15:
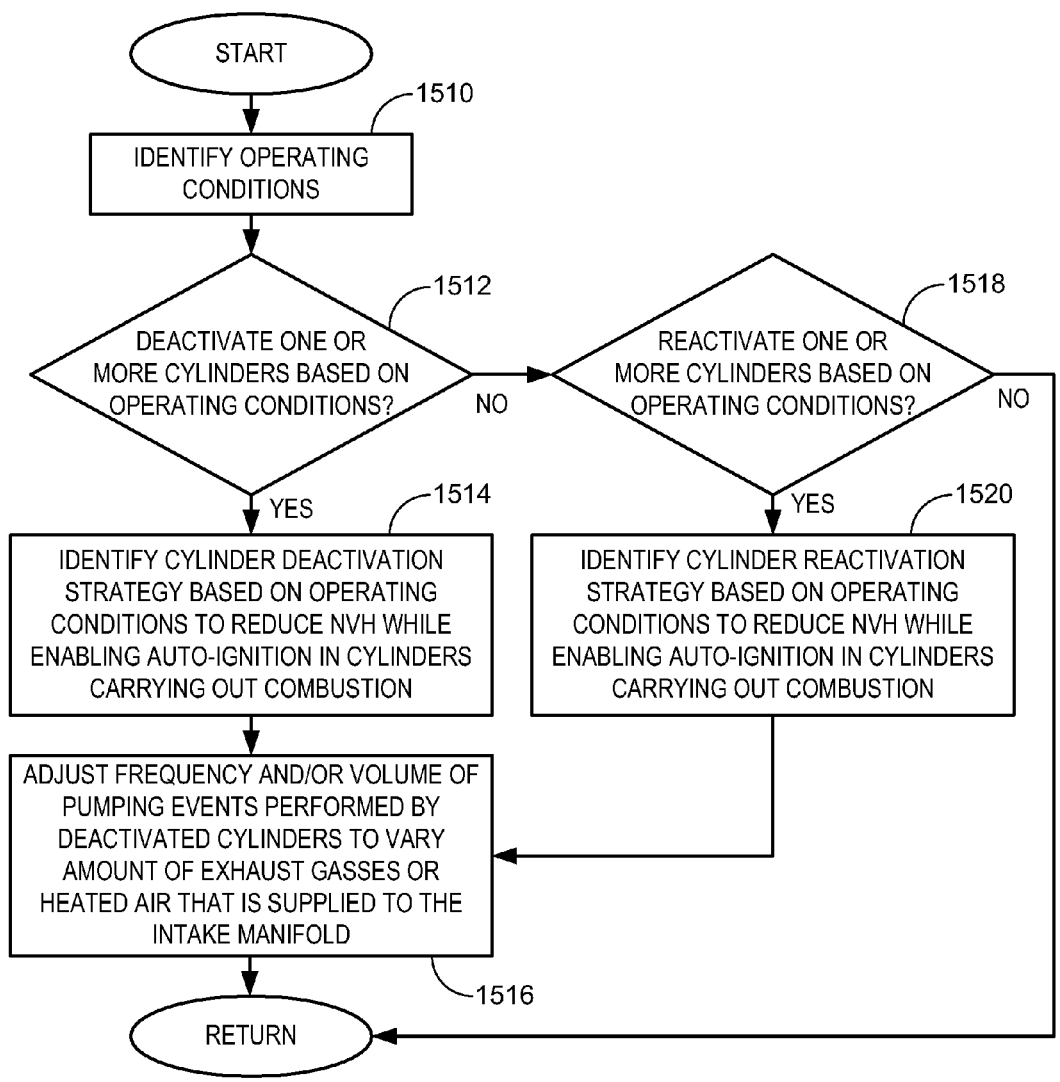
FIG. 15 is a flow chart depicting an example engine control strategy for deactivating or reactivating engine cylinders.

FIG. 15 is a flow chart depicting a routine for controlling the deactivation or reactivation of one or more engine cylinders. As described herein, deactivation of a cylinder includes discontinuing combustion in the cylinder, which may include discontinuing fuel delivery to the cylinder and/or discontinuing spark produced by a spark plug of the cylinder for one or more engine cycles. Note that with a deactivated cylinder, the piston and associated intake and exhaust manifold valves can still be operated to provide a flow of gases to the intake manifold for charge heating. At 1510, the operating conditions may be identified, for example, as described with reference to the operation at 410 of FIG. 4. At 1512, it may be judged whether to deactivate one or more cylinders of the engine based on the identified operating conditions.

Figure 16:
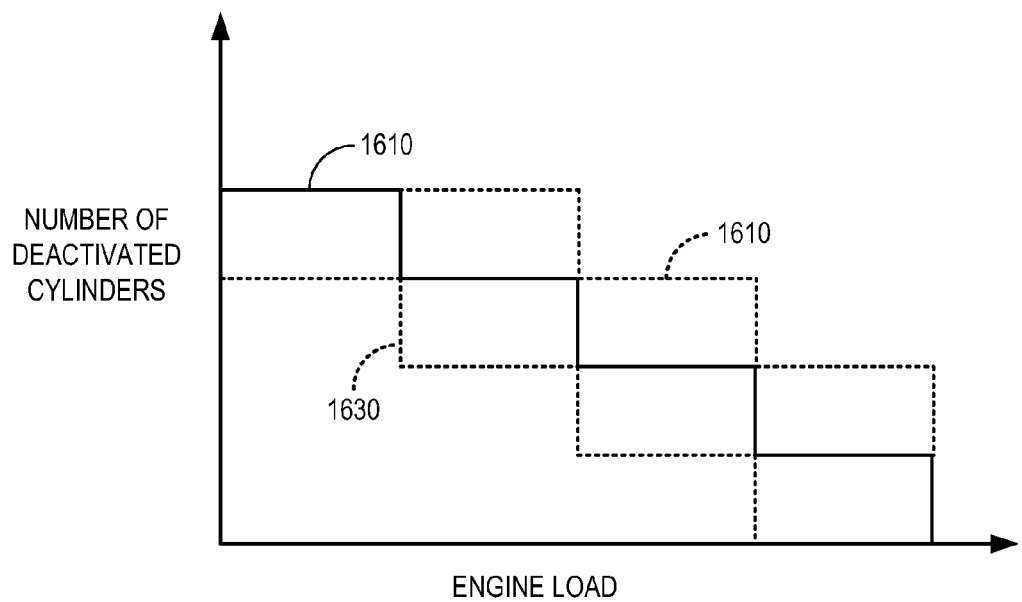
FIG. 16 is a graph depicting an example of how the number of deactivated cylinders may be varied with an operating condition such as engine load.

As one non-limiting example, one or more cylinders of the engine may be deactivated or alternatively reactivated in response to engine load. For example, the control system of the engine may reference a look-up table or map stored in memory in order to judge whether to deactivate or reactivate engine cylinders. FIG. 16 is a graph depicting an example engine control strategy that may be implemented by the control system to control the number of deactivated cylinders. As shown in FIG. 16, for example, at 1610, the number of deactivated cylinders may increase with decreasing engine load, thereby enabling increased engine efficiency and/or reduced emissions. Furthermore, by deactivating one or more cylinders, the other cylinders of the engine that are carrying out combustion may be operated to produce additional torque. Thus, cylinders that are performing auto-ignition may be operated at a load that is within the HCCI mode operating region for the particular cylinder, thereby reducing need for transitioning these cylinders to other combustion modes such as SI.

Returning to FIG. 15, if the answer at 1512 is judged yes (i.e. one or more cylinders are to be deactivated), for example, in response to engine load or other operating condition, the routine may then proceed to 1514. At 1514, a cylinder deactivation strategy may be identified based on the operating conditions to reduce noise and vibration harshness (NVH) of the engine system and/or vehicle driveline while enabling auto-ignition in cylinders carrying out combustion. For example, the control system may identify a range of the number of cylinders that may be deactivated while enabling auto-ignition in other cylinders of the engine carrying out combustion and meeting engine torque demands. As shown in FIG. 16, a range of the number of cylinders that may be deactivated may include a lower bound indicated at 1630 and an upper bound indicated at 1620 surrounding the number of deactivated cylinders indicated by 1610 for a given operating condition such as engine load or engine torque. As one example, the lower range indicated at 1630 can correspond to the lower boundary of the HCCI mode region shown in FIG. 3 for the cylinders of the engine carrying out combustion by auto-ignition. Similarly, the upper range indicated at 1620 can correspond to the upper boundary of the HCCI mode region shown in FIG. 3. The control system can select a number of deactivated cylinders within the range bounded by 1620 and 1630 in order to reduce NVH. For example, NVH may be greater among certain combinations of deactivated cylinders and cylinders carrying out combustion. Furthermore, the position of the deactivated cylinder relative to the other firing cylinders may be selected to provide reduced NVH. In this way, NVH may be reduced while enabling auto-ignition in other cylinders of the engine.

At 1516, the frequency and/or volume of the pumping events performed by the deactivated cylinders may be adjusted to vary the amount of exhaust gases or heated air that is supplied to the intake manifold via the deactivated cylinders. For example, as described with reference to FIGS. 4-6 and as shown in FIG. 9, the frequency at which the deactivated cylinders trap and release intake air from the intake manifold or trap exhaust gases from the exhaust manifold may be varied to control the flow rate of these gases that are supplied the intake manifold. Similarly, the volume of these gases that are trapped by the deactivated cylinders may be varied by controlling valve timing to increase or decrease the flow rate of these gases to the intake manifold. In this way, the amount of charge heating provided to the cylinders carrying out combustion may be adjusted in response to the number of deactivated cylinders.

For example, where an eight cylinder engine is initially operated with two deactivated cylinders each providing exhaust gases to the intake manifold from the exhaust manifold of the engine at a frequency of once every 360 crank angle degrees, deactivation of two more cylinders may result in a reduced pumping frequency of once every 720 crank angle degrees for the four deactivated cylinders if the same amount of charge heating is requested.

Returning to FIG. 15, if the answer at 1512 is no (i.e. no cylinders are to be deactivated), then the routine may proceed to 1518. At 1518, it may be judged whether to reactivate one or more cylinders based on the operating conditions identified at 1510. If the answer at 1518 is no, the routine may return to 1510. Alternatively, if the answer at 1518 is yes, the cylinder reactivation strategy may be identified by the control system at 1520 based on the operating conditions to reduce NVH while enabling auto-ignition in cylinders carrying out combustion. Further, the routine may proceed to 1516 to vary the frequency and/or volume of the pumping events performed by the deactivated cylinders (if any) to vary the flow rate of exhaust gases or heated air to the intake manifold. Note that the frequency and/or volume of the pumping events performed by the remaining deactivated cylinders may be increased in response to the loss in charge heating provided by the reactivated cylinders.

Figure 17:
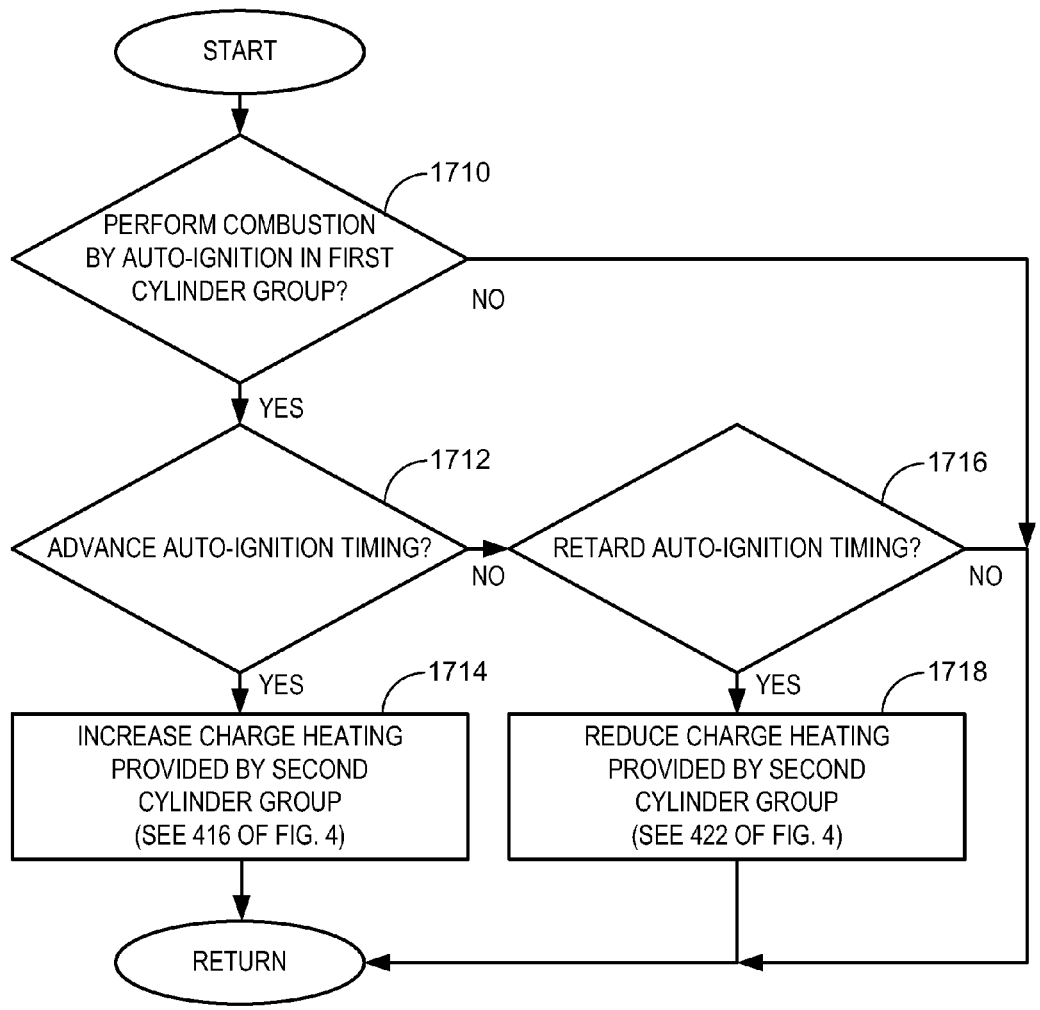
FIG. 17 is a flow chart depicting an example engine control strategy for adjusting the auto-ignition timing for a first cylinder group.

FIG. 17 is a flow chart depicting a routine for controlling auto-ignition timing of a first group of cylinders by varying an amount of charge heating provided to the intake manifold via a second group of cylinders. At 1710, it may be judged whether to perform combustion by auto-ignition in the first group of cylinders. For example, the control system may initiate auto-ignition in the first group of cylinders when the operating conditions are within the HCCI mode region or extended HCCI mode region. If the answer at 1710 is no, the routine may return to 1710. Alternatively, if the answer at 1710 is yes, it may be judged at 1712 whether the auto-ignition timing is to be advanced relative to its current timing.

The control system may advance or retard the auto-ignition timing in response to operating conditions. In at least some conditions, the control system may control the auto-ignition timing so that it occurs around TDC of the cylinder, for example, as shown in FIGS. 7-13. Further, the control system may advance the auto-ignition timing to reduce misfires, or retard the auto-ignition timing to reduce pre-ignition and/or knock.

If the answer at 1712 is yes, the charge heating provided by the second group of cylinders may be increased, for example, as described with reference to operations 416-420 of FIG. 4. Alternatively, if the answer at 1712 is no (i.e. the auto-ignition timing is not to be advanced), it may be judged at 1716 whether to retard the auto-ignition timing. If the answer at 1716 is yes, then the charge heating provided by the second group of cylinders may be reduced, for example, as described with reference to operations 422-426 of FIG. 4. If the auto-ignition timing is not to be advanced or retarded, the routine may return.

Figure 18:
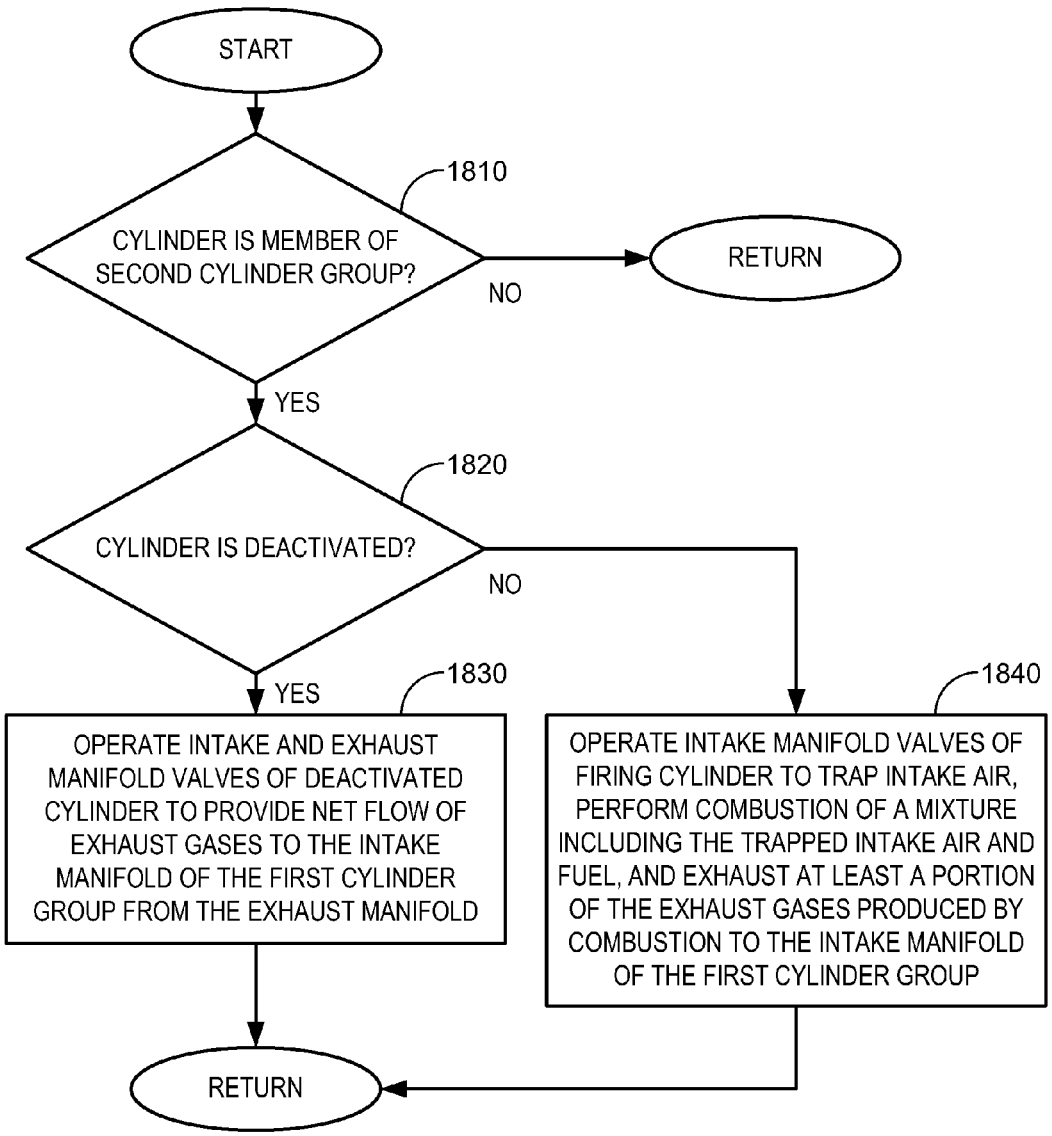
FIG. 18 is a flow chart depicting an example engine control strategy for selecting a charge heating mode for a cylinder based on a deactivated state of the cylinder.

FIG. 18 is a flow chart depicting a routine for controlling cylinders of a second cylinder group for providing charge heating to a first cylinder group. This routine may be performed for each cylinder of the engine. At 1810, it may be judged whether the cylinder is a member of the second cylinder group. If the answer at 1810 is no, the routine may return. Alternatively, if the answer at 1810 is yes, it may be judged at 1820 whether the cylinder is deactivated or whether the cylinder is to be deactivated. If the answer at 1820 is yes, the routine may proceed to 1830. At 1830, the intake and exhaust valves of the deactivated cylinder may be operated to provide a net flow of exhaust gases to the intake manifold of the first cylinder group from the exhaust manifold without performing combustion. Alternatively, if the answer is no (e.g. the cylinder is carrying out combustion); the routine may proceed to 1840. At 1840, at least the intake manifold valves of the cylinder may be operated to temporarily trap intake air from the intake manifold, the cylinder can perform combustion of a mixture including the trapped intake air and fuel, and the intake manifold valves may be operated to exhaust gases produced by combustion of the mixture to the intake manifold of the first cylinder group. Thus, combustion may be performed on intake air having a higher oxygen concentration than the exhaust gases, while deactivated cylinders that are not performing combustion can provide a greater amount of exhaust gases to the intake manifold. In this way, charge heating may be provided to a first cylinder group by providing a net flow of exhaust gases to the intake manifold via a deactivated cylinder and/or intake air may be used to perform combustion and the exhaust gases of the combustion process may be returned to the intake manifold by a firing cylinder of the second cylinder group.

Figure 19:
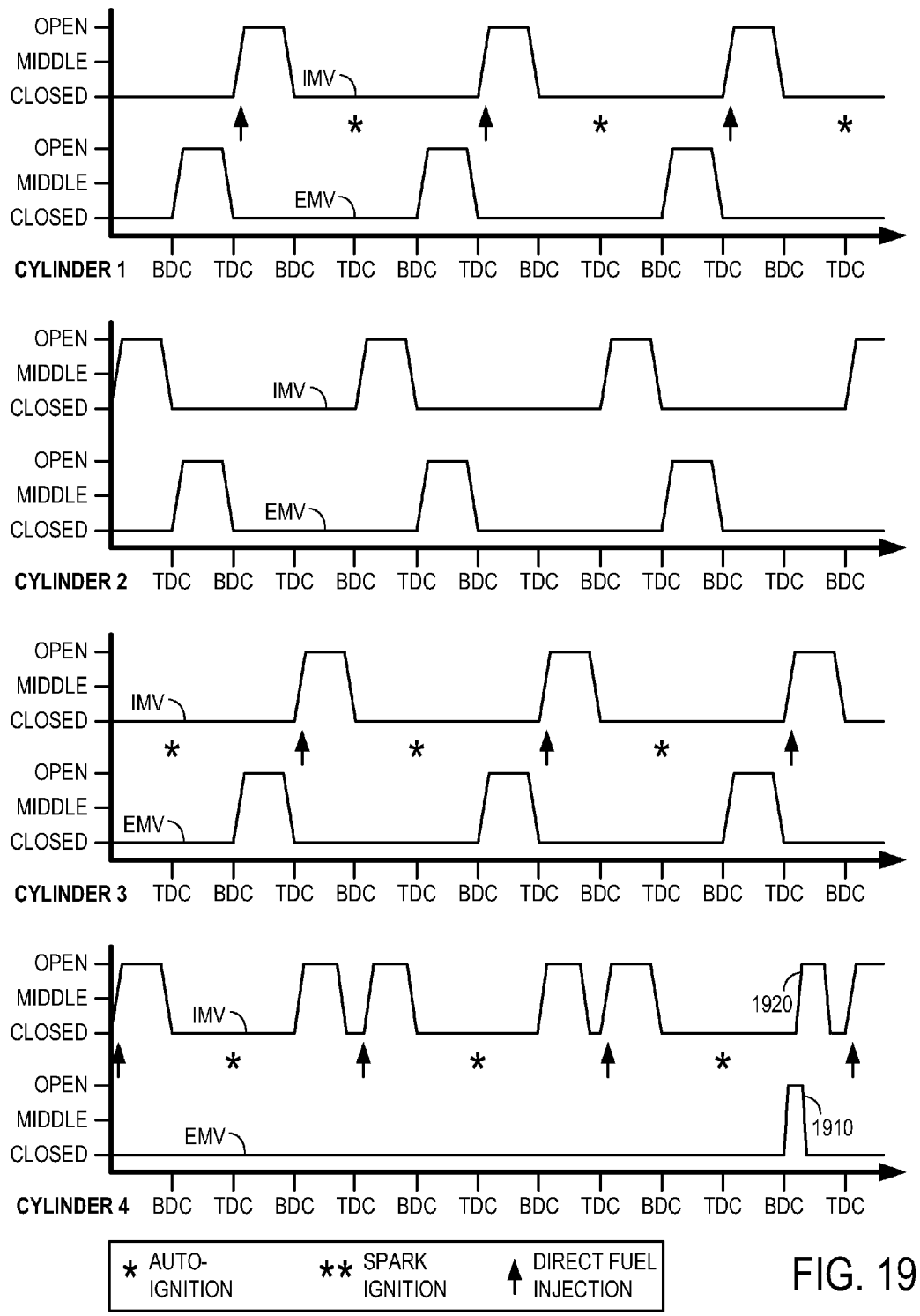
FIG. 19 is a timing diagram for an example engine.

FIG. 19 shows a timing diagram similar to those described with reference to FIGS. 7-13. In this example, cylinders 1 and 3 are members of a first cylinder group, while cylinders 2 and 4 are members of a second cylinder group. Thus, Cylinder 2 and Cylinder 4 are providing charge heating for Cylinder 1 and Cylinder 3. For example, Cylinder 2 may be deactivated, while Cylinder 4 may be performing combustion. As described by the routine of FIG. 18, Cylinder 2 that is deactivated may be operated to provide a net flow of exhaust gases to the intake manifold of the first cylinder group from the exhaust manifold. In contrast, Cylinder 4 that is carrying out combustion can be operated to admit air from at least one intake manifold valve, perform combustion with the admitted air, and exhaust the products of combustion back into the intake manifold. Further, as shown at 1910, the exhaust valve may be operated to enable some of the exhaust gases to be used in the combustion process and the timing of the intake manifold valve may be adjusted accordingly at 1920. Similarly, the exhaust manifold valve may be opened along with the intake manifold valve to provide some of the exhaust gases to both the intake manifold and exhaust manifold.

In some embodiments, where the second cylinder group provides charge heating to the first cylinder group, the control system can vary the absolute number of cylinders of the second cylinder group that are deactivated and the absolute number of cylinders of the second cylinder group that are performing combustion in response to operating conditions. Further, the control system can also vary the number of cylinders of the second cylinder group that are deactivated relative to the first cylinder group in response to operating conditions. Thus, the control system can vary the absolute and relative numbers of cylinders of the second cylinder group that are (1) performing combustion on trapped intake air and releasing at least a portion of the combusted air into the intake manifold, (2) trapping and releasing intake air without carrying out combustion, (3) providing a net flow of exhaust gases to the intake manifold from the exhaust manifold without combustion, and (4) providing a net flow of exhaust gases to the intake manifold from the exhaust manifold while carrying out combustion, responsive to operating conditions as described herein.

Figure 20:
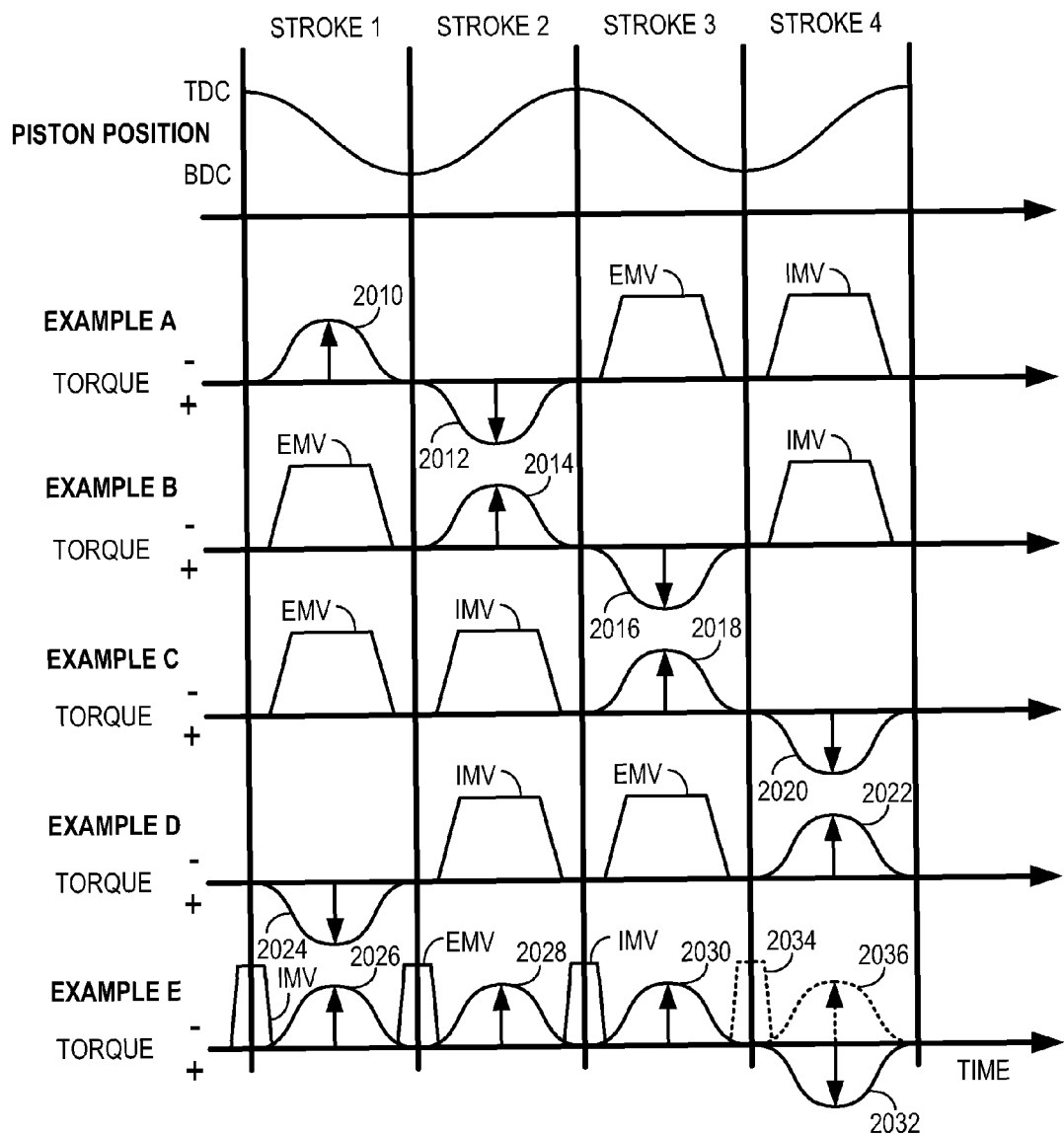
FIG. 20 is a timing diagram showing example torque pulsations for a cylinder providing net flow of gases from the exhaust manifold to the intake manifold.

FIG. 20 is a timeline showing how a torque signature delivered to the crankshaft by a deactivated cylinder of the engine may be varied while providing net flow of gases from the exhaust manifold to the intake manifold of the engine. While in this particular example, the cylinder is operated in a four stroke cycle, it should be appreciated that the strategies described herein can be applied with two, six, eight or other numbered stroke cycles. The horizontal axis of the graph indicates time and the vertical axis for each of examples A-E represents a level of torque delivered to the crankshaft in comparison to piston position.

Examples A-D show operations where the cylinder's torque signature includes at least one stroke of the cycle where torque is absorbed from the crankshaft and another stroke of the cycle where torque is returned to the crankshaft while also providing a net flow of exhaust gases from the exhaust manifold to the intake manifold. Example E shows a cylinder's torque signature including a greater number of strokes where torque is absorbed from the crankshaft than where torque is provided to the crankshaft, while also providing a net flow of exhaust gases from the exhaust manifold to the intake manifold. Thus, examples A-D show an operation where there is a substantially lower net brake torque (e.g. no net braking torque) over the duration of the cylinder cycle, while Example E shows an operation where a greater net brake torque is provided to the crankshaft over the cylinder cycle.

Example A shows at 2010 how a negative torque (e.g. brake torque) may be provided to the crankshaft by the cylinder during the first stroke by holding the intake and exhaust manifold valves closed as the piston moves toward BDC against a vacuum formed in the cylinder. Next, during the second stroke, the torque removed from the crankshaft during the first stroke may be recovered at 2012 by the piston as it returns to TDC by holding the intake and exhaust manifold valves closed. During the third stroke, the exhaust manifold valve (EMV) may be opened and closed as the piston moves toward BDC to trap gases from the exhaust manifold within the cylinder. During the fourth stroke, the intake manifold valve (IMV) may be opened and closed as the piston is moving toward TDC to release the gases to the intake manifold. In this way, the cylinder can provide a net flow of gases from the exhaust manifold to the intake manifold, while a torque signature, including positive and negative torque pulsations, may be transmitted to the crankshaft by the cylinder during the first and second strokes of the cycle.

Example B shows a similar approach to Example A, except the torque pulsation is offset by a stroke. Thus, as Example B is applied to a four stroke operation, the torque pulsation is offset 180 crank angle degrees from Example A. Example B shows how during the first stroke, the exhaust manifold valve may be opened and closed as the piston is moving toward BDC to trap gases from the exhaust manifold within the cylinder. During the second stroke, a negative torque may be provided to the crankshaft at 2014 by the cylinder by holding the intake and exhaust manifold valves closed as the piston moves toward TDC due to compression of the gases trapped within the cylinder. Next, during the third stroke, the torque removed from the crankshaft during the second stroke may be recovered at 2016 by the piston as the trapped gases expands within the cylinder by holding the intake and exhaust manifold valves closed. During the fourth stroke, the intake manifold valve may be opened and closed as the piston moves toward TDC to expel the trapped gases from the cylinder into the intake manifold. In this way, the cylinder can provide a net flow of gases from the exhaust manifold to the intake manifold and a torque pulsation may be transmitted to the crankshaft by the cylinder during the second and third strokes of the cycle while providing substantially no net brake torque to the crankshaft over the entire cycle.

Example C shows a similar approach to Example B, except the torque pulsation is offset by a stroke. Thus, as Example C is applied to a four stroke operation, the torque pulsation is offset 180 crank angle degrees from Example B or 360 crank angle degrees from Example A. Example C shows how during the first stroke, the exhaust manifold valve may be opened and closed as the piston is moving toward BDC to trap gases from the exhaust manifold within the cylinder. During the second stroke, the intake manifold valve may be opened and closed as the piston moves toward TDC to expel the trapped gases from the cylinder into the intake manifold. During the third stroke, a negative torque may be provided to the crankshaft at 2018 (i.e. torque is absorbed from the crankshaft) by the cylinder by holding the intake and exhaust manifold valves closed as the piston moves toward BDC against a vacuum formed within the cylinder. Next, during the fourth stroke, the torque removed from the crankshaft during the third stroke may be recovered at 2020 by the piston as it moves toward TDC by holding the intake and exhaust manifold valves closed. In this way, the cylinder can provide a net flow of gases from the exhaust manifold to the intake manifold and a torque pulsation may be transmitted to the crankshaft by the cylinder during the third and fourth strokes of the cycle while providing substantially no net brake torque to the crankshaft over the cycle.

Example D shows a similar approach to Example C, except the torque pulsation is offset by a stroke. Thus, as Example D is applied to a four stroke operation, the torque pulsation is offset 180 crank angle degrees from Example C, 360 crank angle degrees from Example B, or 540 crank angle degrees from Example A. Example D shows how during the first stroke, the torque may be recovered at 2024 by the cylinder as the compressed gases expand as the piston moves toward BDC. During the second stroke, the intake manifold valve may be opened and closed while the piston moves toward TDC, thereby expelling gases from the cylinder into the intake manifold. During the third stroke, the exhaust manifold valve may be opened and closed while the piston moves toward BDC to trap gases from the exhaust manifold within the cylinder. During the fourth stroke, the trap gases may be compressed as the cylinder moves toward TDC, thereby removing torque from the crankshaft as indicated at 2022. In this way, the cylinder can provide a net flow of gases from the exhaust manifold to the intake manifold and a torque pulsation may be transmitted to the crankshaft by the cylinder during the first and fourth strokes of the cycle while providing substantially no net brake torque to the crankshaft over the cycle.

As will be appreciated in light of the present disclosure, one or more of examples A-D may be performed to provide a torque pulsation to the crankshaft by the cylinder during a particular phase of the cycle. These torque pulsations may be selected, for example, to reduce NVH in the engine or vehicle driveline that may be caused by cylinder deactivation, among other causes of NVH. Note also that one or more cylinders may each be operated to perform one of examples A-D to reduce NVH. Thus, the timing at which the torque pulsation of the torque signature is performed relative to other cylinders may be selected while proving no net braking torque to the crankshaft and while providing a net flow of gases from the exhaust manifold to the intake manifold. Therefore, greater flexibility in the number and/or relative location of deactivated cylinders of the engine may be possible by varying the torque signatures that are provided by each of the deactivated cylinders as shown in examples A-D.

Example E shows an example where a net braking torque may be provided to the crankshaft while also proving a net flow of exhaust gases from the exhaust manifold to the intake manifold. During the first stroke, around TDC of the first stroke, the exhaust intake manifold valve may be opened and closed to rapidly expel gases from the cylinder, thereby releasing the gases compressed by a previous stroke. During the first stroke, torque may be removed from the driveline at 2026 as the piston moves toward BDC against the vacuum formed within the cylinder. Around BDC between the first and the second stroke, the intake manifold valve may be rapidly opened and closed to admit gases from the cylinder, thereby diminishing the vacuum within the cylinder. During the second stroke, torque may be again removed at 2028 from the crankshaft by the piston compressing the gases admitted to the cylinder from the exhaust manifold. Around TDC between the second the third strokes, the intake manifold valve may be rapidly opened and closed to expel the compressed gases into the intake manifold. During the third stroke, the cylinder can remove torque from the crankshaft at 2030 as piston moves toward BDC against a vacuum formed within the cylinder. During the fourth stroke, the intake and exhaust manifold valves can be held closed while the piston returns to TDC, thereby returning the torque to the crankshaft during the fourth stroke at 2032 which was removed from the crankshaft during the third stoke. Thus, in this example, a net brake torque is achieved for the cycle.

Alternatively, for example, as shown at 2034, the exhaust manifold valve may be opened and closed around BDC between the third and fourth strokes to admit gases from the exhaust manifold. Thus, during the subsequent fourth stroke, the gases may be compressed by the piston as it moves toward TDC, thereby removing torque from the crankshaft as indicated at 2036. In this way, the amount of braking torque may be increased or decreased by varying the number of valve opening events around TDC and BDC during the cycle. For example, the net brake torque may be increased by opening and closing at least one valve of the cylinder during more TDC or BDC events, while the net brake torque may be reduced by opening and closing at least one valve of the cylinder during less TDC or BDC events.

Note that the approaches described herein with reference to examples A-D may be used to enable the net brake torque to be offset from that shown in Example E. For example, the intake and exhaust manifold valves may be operated to provide net braking torque during other strokes, while also providing a net flow of exhaust gases from the exhaust manifold to the intake manifold. In this way, engine braking may be achieved while transferring exhaust gases from the exhaust manifold to the intake manifold.

It should be appreciated that various synergies may be achieved with approaches described herein. As one non-limiting example, HCCI operation in a first group of cylinders may be enabled by operating a second group of cylinders to provide heated gases to the intake manifold either by temporarily trapping and releasing intake air, or by transferring gases from the exhaust manifold to the intake manifold. During conditions where the requested engine torque is lower than a threshold of the HCCI operating mode region, one or more cylinders may be deactivated to extend the HCCI operating range. However, the deactivation of one or more cylinders may cause increased NVH, under some conditions. Thus, some or all of the cylinders of the second cylinder group may be operated as described with reference to FIG. 20 to provide torque signatures that cancel out or reduce the NVH caused by the deactivated cylinders and/or expand the number of deactivated cylinders or the relative location of the deactivated cylinders within the engine.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating an engine including at least a first cylinder and a second cylinder, the method comprising:
   operating the first cylinder of the engine to provide a net flow of gases from an intake manifold to an exhaust manifold for each cycle of the first cylinder while repetitively combusting a homogeneous mixture including said gases and directly injected fuel in said first cylinder by auto-ignition; and
   during said operation of the first cylinder, repetitively operating an intake manifold valve of the second cylinder to admit gases from the intake manifold into the second cylinder, injecting fuel directly into the second cylinder to form a mixture of said admitted gases and fuel in said second cylinder, spark-igniting the mixture in the second cylinder, and exhausting said combusted mixture from the second cylinder into the intake manifold via the intake manifold valve while holding an exhaust manifold valve of the second cylinder closed, said homogeneous mixture including at least a portion of said combusted mixture exhausted from the second cylinder.

2. An engine system for a vehicle, comprising:
   a first cylinder including a piston moveably arranged within the first cylinder configured to initiate combustion within the first cylinder by auto-ignition;
   a second cylinder including a spark plug;
   an intake manifold communicating with the first and second cylinders;
   an exhaust manifold communicating with the first and second cylinders;
   a control system configured to spark-ignite inducted gasses and injected fuel in the second cylinder, deliver an amount of burnt spark-ignited gasses from the second cylinder to the intake, flow gases, including the burnt gas amount, from the intake to the exhaust through the first cylinder, carry out auto-ignition of the inducted gasses and injected fuel in the first cylinder, and adjust timing of said auto-ignition by adjusting second cylinder valve timing to vary the burnt gas amount.

3. The system of claim 2, wherein an intake manifold valve is opened and closed by the control system via an electromagnetic valve actuator.

4. The system of claim 3, further comprising an exhaust manifold valve arranged between the exhaust manifold and the second cylinder, and wherein the control system is further configured to hold the exhaust manifold valve closed during said spark-ignition operation of the second cylinder.

5. A method for first and second engine cylinders with an intake and exhaust, comprising:

spark-igniting gasses in the second cylinder;

delivering an amount of burnt spark-ignited gasses from the second cylinder to the intake;

flowing gases, including the burnt gas amount, from the intake to the exhaust through the first cylinder with auto-ignition in the first cylinder; and adjusting timing of said auto-ignition by adjusting second cylinder valve timing to vary the burnt gas amount.

6. The method of claim 5, wherein the second mixture is stratified upon combustion.

7. The method of claim 5, wherein the second cylinder includes a piston and wherein said method further comprises compressing and expanding the burnt gases within the second cylinder with the piston.

8. The method of claim 5, wherein the first cylinder includes a piston and wherein said method further includes compressing the gasses with the piston to cause said auto-ignition in the first cylinder.

9. The method of claim 5, further comprising adjusting a period that the burnt gases are retained by the second cylinder by adjusted the second cylinder valve timing.

10. The method of claim 9, wherein the valve timing is adjusted via an electromagnetic actuator.

11. The method of claim 5, further comprising, during operation of the first cylinder, performing said spark ignition of the first cylinder.

12. The method of claim 11, wherein fuel is directly injected into the second cylinder by a direct injector.

* * * * *